(12) United States Patent
Thorwarth

(10) Patent No.: US 10,744,605 B2
(45) Date of Patent: Aug. 18, 2020

(54) MANUFACTURING DEVICE, MANUFACTURING PLANT AND METHOD

(71) Applicant: KUKA Systems GmbH, Augsburg (DE)

(72) Inventor: Paul Thorwarth, Augsburg (DE)

(73) Assignee: KUKA Systems GmbH, Augsburg (DE)

(*) Notice: Subject to any disclaimer, the term of this patent is extended or adjusted under 35 U.S.C. 154(b) by 128 days.

(21) Appl. No.: 15/552,047

(22) PCT Filed: Feb. 19, 2016

(86) PCT No.: PCT/EP2016/053574
§ 371 (c)(1),
(2) Date: Aug. 18, 2017

(87) PCT Pub. No.: WO2016/131968
PCT Pub. Date: Aug. 25, 2016

(65) Prior Publication Data
US 2018/0036845 A1    Feb. 8, 2018

(30) Foreign Application Priority Data

Feb. 19, 2015  (DE) ............... 20 2015 100 782 U
Mar. 12, 2015  (DE) ............... 10 2015 103 642
Nov. 27, 2015  (DE) ............... 20 2015 106 459 U

(51) Int. Cl.
*B23P 23/06* (2006.01)
*G05B 19/418* (2006.01)
(Continued)

(52) U.S. Cl.
CPC ............. *B23P 23/06* (2013.01); *B23P 21/004* (2013.01); *B62D 65/022* (2013.01);
(Continued)

(58) Field of Classification Search
CPC .. B23P 21/004; B23P 23/06; G05B 19/41805; B23Q 7/14
See application file for complete search history.

(56) References Cited

U.S. PATENT DOCUMENTS 4,069,764 A * 1/1978 Teyssedre ............... B23P 23/06
                                                    104/172.4
4,548,346 A * 10/1985 Kraus ................... B23P 21/004
                                                    198/339.1
(Continued)

FOREIGN PATENT DOCUMENTS

AT         406030 B      1/2000
CN      101439467 A      5/2009
(Continued)

OTHER PUBLICATIONS

Machine Translation of DE19948139A1 (Year: 1999).*
(Continued)

*Primary Examiner* — Jacob J Cigna
*Assistant Examiner* — Michael W Hotchkiss
(74) *Attorney, Agent, or Firm* — Dorton & Willis, LLP

(57) ABSTRACT

An automatic manufacturing device for vehicle body parts includes at least one program-controlled manufacturing means and a processing zone (configured to sequentially receive at least two different load accepting means. A detection device detects a type designation of one of the load accepting means, and a control device ascertains the type of the load accepting means on the basis of the detected type designation. The control device then and selects and executes a control program for the manufacturing means on the basis of the ascertained type.

21 Claims, 14 Drawing Sheets

(51) Int. Cl.
  *B62D 65/02* (2006.01)
  *B23P 21/00* (2006.01)
(52) U.S. Cl.
  CPC .... *G05B 19/41805* (2013.01); *B23P 2700/50* (2013.01); *G05B 2219/31036* (2013.01); *G05B 2219/50393* (2013.01); *Y02P 90/04* (2015.11); *Y02P 90/12* (2015.11); *Y02P 90/265* (2015.11); *Y02P 90/28* (2015.11)

(56) References Cited

U.S. PATENT DOCUMENTS

| | | | | |
|---|---|---|---|---|
| 4,722,653 | A * | 2/1988 | Williams | B23P 21/00 198/346.1 |
| 4,894,908 | A * | 1/1990 | Haba, Jr. | B23P 21/004 29/711 |
| 5,027,502 | A * | 7/1991 | Sakamoto | B62D 65/12 29/783 |
| 5,347,700 | A * | 9/1994 | Tominaga | B23P 21/004 29/430 |
| 6,519,837 | B1 * | 2/2003 | Ichikawa | B23P 21/004 29/720 |
| 6,817,829 | B2 * | 11/2004 | Kameda | B65G 61/00 414/789.6 |
| 7,331,439 | B2 * | 2/2008 | Degain | B23K 37/047 198/339.1 |
| 7,764,191 | B2 * | 7/2010 | Hall | G05B 19/042 340/12.51 |
| 8,201,723 | B2 * | 6/2012 | Kilibarda | B62D 65/00 228/49.1 |
| 8,626,329 | B2 * | 1/2014 | Dickson | B23P 21/004 700/112 |
| 8,713,780 | B2 * | 5/2014 | Kilibarda | B62D 65/02 29/430 |
| 9,003,646 | B2 * | 4/2015 | Kim | B25J 9/0084 269/289 R |
| 9,581,983 | B2 * | 2/2017 | Kilibarda | G05B 19/4189 |
| 10,108,186 | B2 * | 10/2018 | Klumpp | B23P 21/004 |
| 2003/0110618 | A1 * | 6/2003 | Magnuson | B23K 26/0093 29/720 |
| 2008/0131255 | A1 * | 6/2008 | Hessler | B65G 1/1378 414/788.1 |
| 2014/0007432 | A1 * | 1/2014 | Grevener | B62D 65/12 29/897.2 |
| 2014/0090252 | A1 * | 4/2014 | Sisco | B23P 23/00 29/897.2 |
| 2014/0165388 | A1 * | 6/2014 | Kim | B25J 15/0061 29/823 |
| 2014/0259414 | A1 * | 9/2014 | Hayes | A61B 5/6892 5/611 |
| 2015/0018999 | A1 * | 1/2015 | Lee | G05B 19/402 700/114 |
| 2017/0329315 | A1 * | 11/2017 | Kanemaru | G05B 19/41845 |

FOREIGN PATENT DOCUMENTS

| | | | | |
|---|---|---|---|---|
| CN | 104276227 | A | | 1/2015 |
| CN | 104723115 | A * | 6/2015 | |
| DE | 142162 | A1 | | 6/1980 |
| DE | 158371 | A1 | | 1/1983 |
| DE | 3408720 | A1 | | 9/1985 |
| DE | 3536014 | A1 | | 4/1986 |
| DE | 19948139 | A1 * | 4/2001 | ............ B23P 23/06 |
| DE | 202005001780 | U1 | | 6/2006 |
| DE | 102005042179 | A1 | | 3/2007 |
| DE | 102005059426 | A1 | | 6/2007 |
| DE | 102008009995 | A1 | | 8/2009 |
| DE | 102008009995 | A1 * | 8/2009 | ............ B23P 21/004 |
| DE | 102006003555 | B4 * | 1/2010 | .......... G05B 19/402 |
| DE | 202008012602 | U1 | | 3/2010 |
| DE | 202009005237 | U1 | | 1/2011 |
| EP | 0201262 | B1 * | 1/1990 | ............ B23P 21/004 |
| EP | 0933161 | A1 | | 8/1999 |
| EP | 1120189 | A1 | | 8/2001 |
| EP | 2100804 | A1 | | 9/2009 |
| EP | 2554459 | A1 | | 2/2013 |
| EP | 2509898 | B1 * | 1/2019 | ............ B23Q 7/04 |
| FR | 2757819 | A1 | | 7/1998 |
| JP | H7299705 | A | | 11/1995 |
| JP | H11058185 | A | | 3/1999 |
| KR | 20140078427 | A * | 6/2014 | |
| WO | 2012166775 | A1 | | 12/2012 |

OTHER PUBLICATIONS

Machine Translation of CN104723115A (Year: 2013).*
Machine Translation of DE102008009995A1 (Year: 2008).*
Machine Translation of KR-20140078427-A (Year: 2014).*
Machine Translation of DE102006003555B4 (Year: 2007).*
European Patent Office; Search Report and Written Opinion in International Patent Application No. PCT/EP2016/053574 dated Jun. 17, 2016; 18 pages.
German Patent Office; Search Report in related German Patent Application No. 20 2015 100 782.5 dated Dec. 8, 2015; 5 pages.
German Patent Office; Search Report in related German Patent Application No. 20 2015 106 459A dated Oct. 11, 2016; 2 pages.
European Patent Office; Search Report and Written Opinion in related International Patent Application No. PCT/EP2016/078012; 11 pages.
International Bureau of WIPO; International Preliminary Report on Patentability in parent International Patent Application No. PCT/EP2016/053574 dated Aug. 31, 2017; 7 pages.
Chinese Patent Office; Office Action in related Chinese Patent Application No. 201680011260.6 dated Dec. 21, 2018; 10 pages.
Chinese Patent Office; Search Report in related Chinese Patent Application No. 201680011260.6 dated Dec. 12, 2018; 2 pages.

* cited by examiner

MANUFACTURING DEVICE, MANUFACTURING PLANT AND METHOD

CROSS-REFERENCE

This application is a national phase application under 35 U.S.C. § 371 of International Patent Application No. PCT/EP2016/053574 filed Feb. 19, 2016 (pending), which claims the benefit of German Patent Application No. DE 20 2015 106 459.4 filed Nov. 27, 2015, German Patent Application No. DE 20 2015 103 642.8 filed Mar. 12, 2015, and German Patent Application No. DE 20 2015 100 782.5 filed Feb. 19, 2015, the disclosures of which are incorporated by reference herein in their entirety.

TECHNICAL FIELD

The invention relates to a manufacturing system, a manufacturing facility and a process having the features in the preamble of the main method and device claims.

Manufacturing facilities for the body shell of vehicle bodies, in which the manufacturing zone is divided into two or more separate lines in which manufacturing cells are interlinked by a conveyor system, are known in the field. The sequence of manufacturing steps and the manufacturing cells involved in it is firmly established. The workpieces are transported from cell to cell primarily by handling robots. These manufacturing facilities can be configured flexibly for different types of vehicle bodies, wherein the fixed interlinking remains in place.

The problem addressed by the present invention is that of indicating improved manufacturing technology.

SUMMARY

The invention solves this problem with the features of the apparatus described herein.

The automated manufacturing technology, i.e. the manufacturing facility, the manufacturing system and the manufacturing process, are distinguished by a high level of flexibility. They also result in improvements in utilization and optimization possibilities and increased economic efficiency.

The one or more manufacturing systems arranged in the manufacturing facility can independently carry out a processing method on the basis of a locally detected type identifier of a load suspension device. They are thus capable of performing different processing methods depending upon the type of load suspension device. Different application-specific tools can also be employed for this purpose. The manufacturing systems and the processing methods executed there can additionally be reconfigured quickly, if necessary.

The different type identifiers can correlate with the different workpieces. The association can be selected freely and can be modified. Based on the type of load suspension device detected, the control system also recognizes the respective workpiece. The load suspension device can be positioned precisely and in a correct way for processing. At least two different types of load suspension devices are employed within a manufacturing facility. Preferably, a multitude of different types are used. Within a larger manufacturing facility, the same types can be employed in different and spatially and functionally separate regions of the facility.

In one embodiment, a type identifier can be configured as encoding and can contain further information and data in addition to indicating the type. A plurality of identifier fields can be provided for this purpose. The additional information and data can include identity information for the load suspension device and/or a workpiece or model specifications and/or an identifier of the most recently visited manufacturing system or manufacturing cell.

Processing and handling of multi-component workpieces or assemblies can take place in the manufacturing systems. This can include the assembling of workpiece components, lifting and releasing a workpiece from the load suspension device for further processing in a suspended state. The workpiece processing can also take place on the load suspension device, which can be appropriately positioned in a prescribed position for this purpose. The load suspension device can remain connected to the conveying means here or be separated from it.

Moreover, a workpiece can be transferred from a load suspension device to another load suspension device of the same or a different type.

In a separate inventive idea, an automatic manufacturing system for workpieces, in particular vehicle body components, is provided which has at least one program-controlled manufacturing means and one processing zone, wherein a manufacturing means is arranged in a processing zone designed for the sequential receipt of at least two load suspension devices of different types, wherein said manufacturing means is configured to handle a workpiece, in particular for the suspended retention of the workpiece during the processing method, and to transfer the workpiece to another load suspension device of the same or a different type (A, B, C, D). The separate invention also relates to a manufacturing facility having this kind of manufacturing system.

Furthermore, a separate invention relates to a method for processing workpieces, in particular vehicle body components, in an automatic manufacturing system that has at least one program-controlled manufacturing means and a processing zone, having the following method steps:

the workpiece is received by at least one manufacturing means from a first load suspension device; the first load suspension device is displaced from the processing zone of the first manufacturing system; a second load suspension device, which is of a different type from the first load suspension device, is displaced into the processing zone of the first manufacturing system and the workpiece is deposited onto the second load suspension device.

The transfer can take place either directly or with an intermediate deposit in the processing zone. Workpiece processing can also take place here.

The linking conveying technology can be displaced into the manufacturing system, which simplifies the process and reduces effort. The load suspension devices can be changed during the production process, wherein a further pre-processed workpiece or new workpiece components can be supplied together with the second or further load suspension devices. Additionally, the load suspension devices and the conveying mechanism can be at least temporarily disengaged from the processing method and utilized in a better way. The transfer of workpieces between identical or different kinds of load suspension devices in a manufacturing system, in particular in a processing zone located there and with the manufacturing means available there, represents the aforementioned separate inventive significance. This can also be used without a type identifier and its detection.

The manufacturing system can be designed for a primary process and can be linked to a further manufacturing system for a secondary process on a workpiece. The further manufacturing system serves as an extension. For example, processes can be carried out here that are not possible or very difficult in the application-flexible manufacturing system. Multiple other manufacturing systems can be linked with the primary manufacturing system in a quadrant matrix. Furthermore, the cycle time can be shortened and the manufacturing output can be increased by diversifying and performing a plurality of processes simultaneously. The exchange of workpieces can take place via interfaces in the edge region of the manufacturing systems. The interfaces can be located on a protective partition surrounding each manufacturing system. The interfaces located on the conveying path can be configured as portals in the protective partition for empty and loaded conveying means.

This embodiment of the manufacturing system, the manufacturing process and the manufacturing facility can advantageously be combined with the aforementioned separate inventive idea, which is directed to the transfer of workpieces.

The claimed manufacturing technology permits a decentralized control of a manufacturing facility and a reduction and flexibilization of the control effort. Additionally, refitting of the manufacturing facility and of a production process as well as the integration of further workpieces, processing methods and production processes can take place quickly and without much effort. An overall facility control system that has heretofore comprised all of the processes can be omitted.

The manufacturing systems, preferably in the form of manufacturing cells, are themselves highly flexible and can be used for very different workpieces and applications, e.g. joining processes, in particular welding, soldering or adhesive processes, shaping processes, assembly processes, application processes or the like. The application-specific tools required for this can be kept in an external supply and can be brought to the manufacturing systems by a conveying mechanism as needed in order to automatically equip and switch the tools of the system. The same conveying mechanism can also be used to transport the workpieces.

The manufacturing systems of the automated manufacturing facility are interlinked by conveyor technology in a way that is flexible and can be reconfigured as required so that they are linked both to each other and to supplies, particularly for various application-specific tools and for different workpieces.

The highly flexible conveying mechanism can be configured in any suitable way. It preferably comprises a multitude of autonomous and individually controllable conveying means, which move on a multitude of different conveying paths. Preferably, a network of conveying paths is provided, on which the conveying means travel on predetermined conveyor tracks between the manufacturing systems and supplies, wherein the conveyor tracks can be freely selected and programmed. Moreover, the conveying mechanism is flexible with regard to the transport possibilities for application-specific tools and for workpieces. Adapted load suspension devices that can be permanently or interchangeably attached to the conveying means are provided for this purpose. The conveying means and/or the load suspension devices can likewise be stored in one or more supplies and can be retrieved and employed as needed.

A single- or multi-component workpiece can be processed in a production process and a series of multiple manufacturing steps or manufacturing segments, wherein the manufacturing steps are each controlled autonomously in the manufacturing systems of a manufacturing facility by the respective selected control program, and the production process is controlled by a warehouse manager of the manufacturing facility by displacing the load suspension devices and conveying mechanisms.

Preferably, the multitude of control programs is stored in a storage means of the control system, in particular in exactly one storage means. It is further preferable that the multitude of control programs comprises at least one control program for at least two types of load suspension devices. In other words, the storage means contains at least two control programs, namely at least one control program for each of the at least two types of load suspension devices. For example, a first control program can be provided to control the at least one manufacturing means for processing or handling a first type of load suspension device, and a second control program can be provided to control the at least one manufacturing means for processing or handling a second type of load suspension device. Obviously, the storage means can also have two or more control programs for processing or handling a single type of load suspension device. Furthermore, the storage means can include a control program for all types of load suspension devices.

It is provided in one embodiment that a parking zone for load suspension devices be associated with and upstream of at least one manufacturing system. The parking zone can serve as a buffer storage area and can be used for sequence recovery when multiple different types of load suspension devices are supposed to activate the manufacturing system in a prescribed sequence and have arrived in the incorrect order. This is advantageous in particular during the transfer of a workpiece from one load suspension device to the other in the processing zone.

One embodiment provides that each of the load suspension devices of different types is transported in its own manufacturing loop on a programmed, preferably ring-shaped, conveyor track. The manufacturing loop can extend to one or more associated manufacturing systems and possibly to a supply for workpieces and/or tools and/or LAMs. The manufacturing loop can correspond e.g. to a manufacturing process for a workpiece and the manufacturing steps provided for it to produce a manufactured or intermediate product. Forming a loop simplifies the effort required for conveyance and programming and shortens the conveying distances. One or more conveying means can travel on a manufacturing loop. A buffer storage area for loaded load suspension devices can be assigned to a supply for workpieces and could possibly be incorporated into a manufacturing loop. The processing and loading times can be decoupled, and the number of conveying means for the transport of the load suspension devices reduced.

The automatic manufacturing technology has particular advantages for the body shell of vehicle bodies. It can also successfully be employed in other technical fields.

BRIEF DESCRIPTION OF THE DRAWINGS

The invention is shown in an exemplary and schematic fashion in the drawings.

DETAILED DESCRIPTION

The invention relates to a manufacturing facility (1) and a manufacturing process for workpieces (2, 2'). The invention further relates to a manufacturing system (18-22) for workpieces (2, 2') and production processes running there.

The manufacturing facility (1) and its components, in particular the manufacturing systems (18-22), are automated and program-controlled.

The workpieces (2, 2') can be of any type and size. They can be single-part or multi-part. They are preferably components of vehicle bodies. The manufacturing facility (1) can be used, for example, for the body shell of vehicle bodies. The workpieces (2) and (2') are configured differently.

Figure 8:
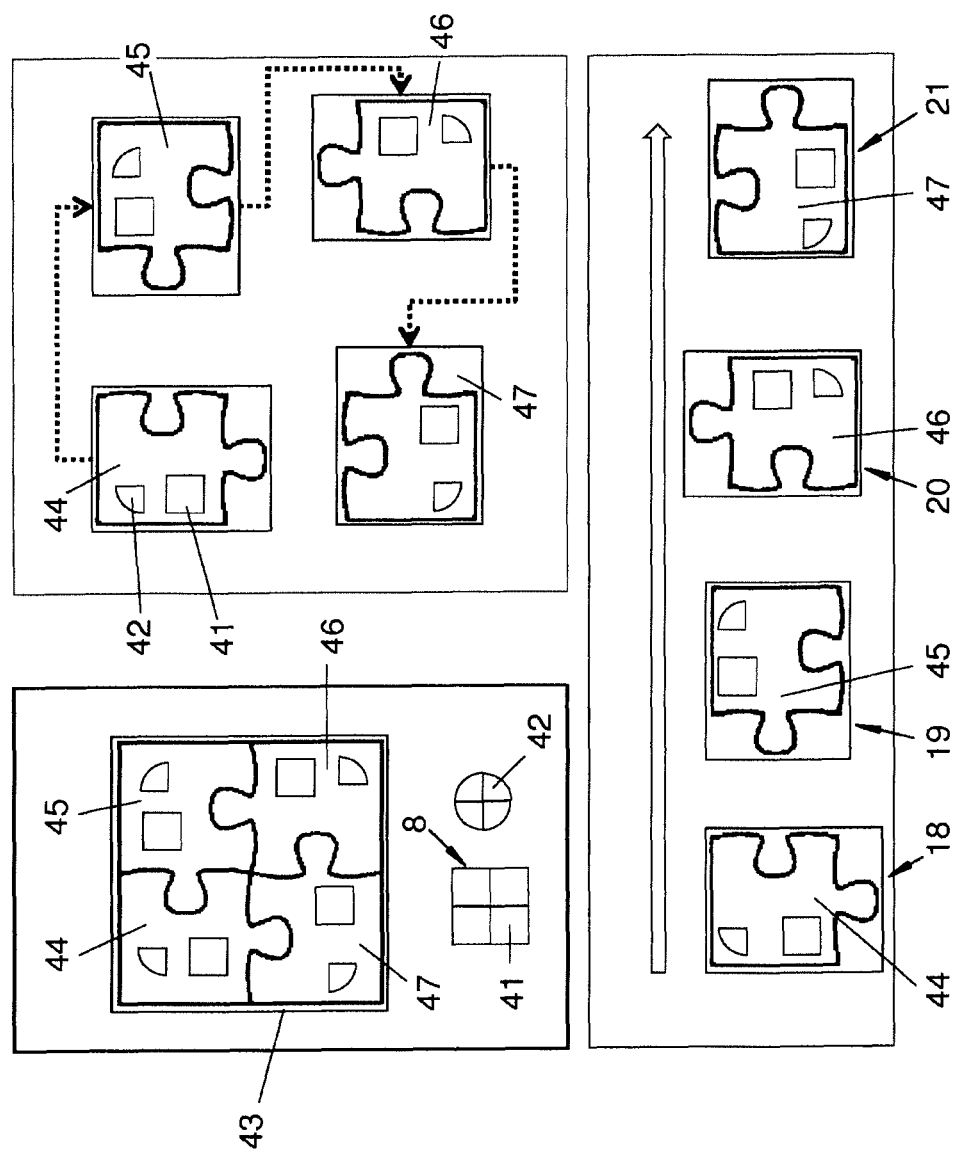
FIG. 8 is a manufacturing process with segmentation, sequence and decentralization
Figure 9:
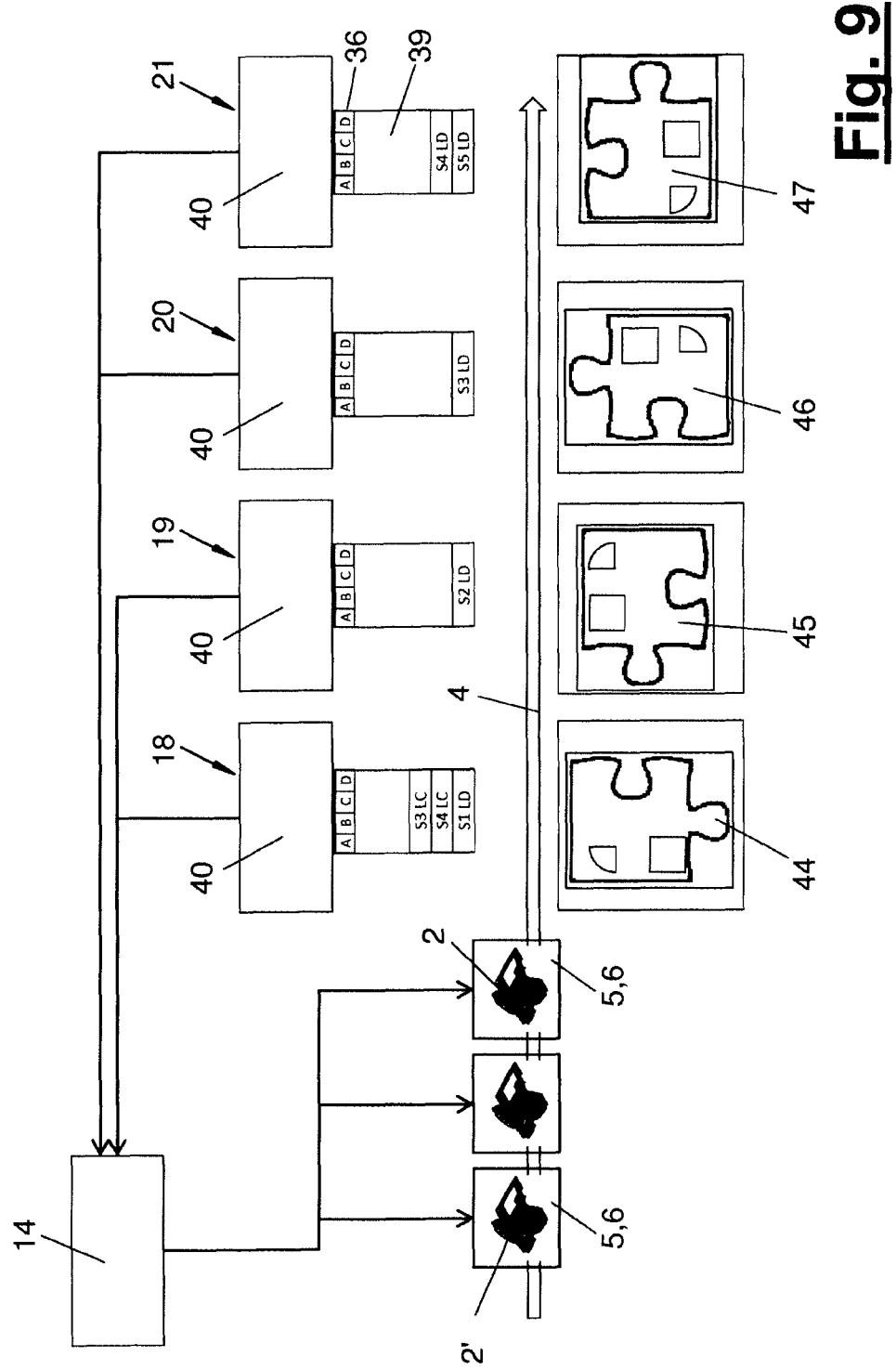
FIG. 9 is a control concept for the manufacturing process according to FIG. 8.
Figure 10:
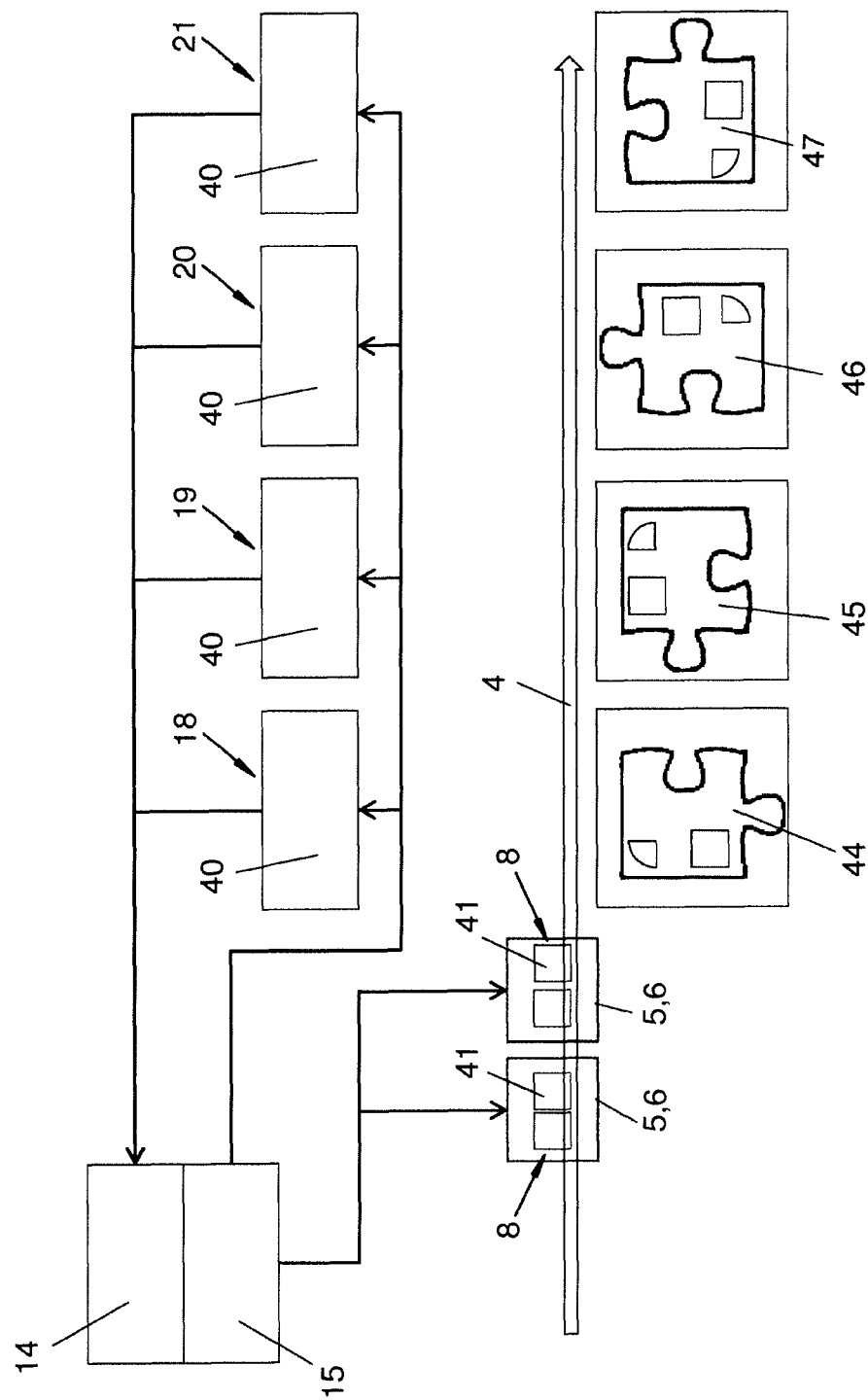
FIG. 10 is the control concept according to FIG. 9 with a tool supply.

According to FIGS. 8 through 10, one or more workpieces (2, 2') can be processed in a series of manufacturing steps (44-47) with different production processes during the course of the automatic manufacturing process. The number of steps is determined by the process volume, the utilized capacity, rate settings and other criteria. In the case of the body shell, for instance, a manufactured product (43), in particular a vehicle body assembly, is hereby produced by assembling and joining workpiece components. This can be an intermediate product, from which an end product is created by additional processes, e.g. connecting them to further workpiece components or to intermediate products produced elsewhere. The manufacturing steps (44-47) are preferably performed in sequence in a plurality of manufacturing systems (18-22). According to FIGS. 8 and 9, one or more process segments are carried out in one manufacturing step (44-47).

These production processes can involve different techniques, e.g. joining, in particular welding, soldering or adhering, applying and removing materials, heat treatments, shaping, machining, assembling and installation processes or the like.

The manufacturing facility (1), the manufacturing process and the manufacturing system (18-22) can be adapted in a flexible and application-specific way. An adaptation to different production processes and/or different workpieces (2, 2') is distinguished by an application specification.

Different application-specific tools (8) are required for different processes. The application-specific tools (8) can be individual tools or tool sets. According to FIG. 8, they can consist of a plurality of tool segments (41).

For the sake of simplicity, the application-specific tools (8) will hereafter be referred to as tools (8).

Figure 1:
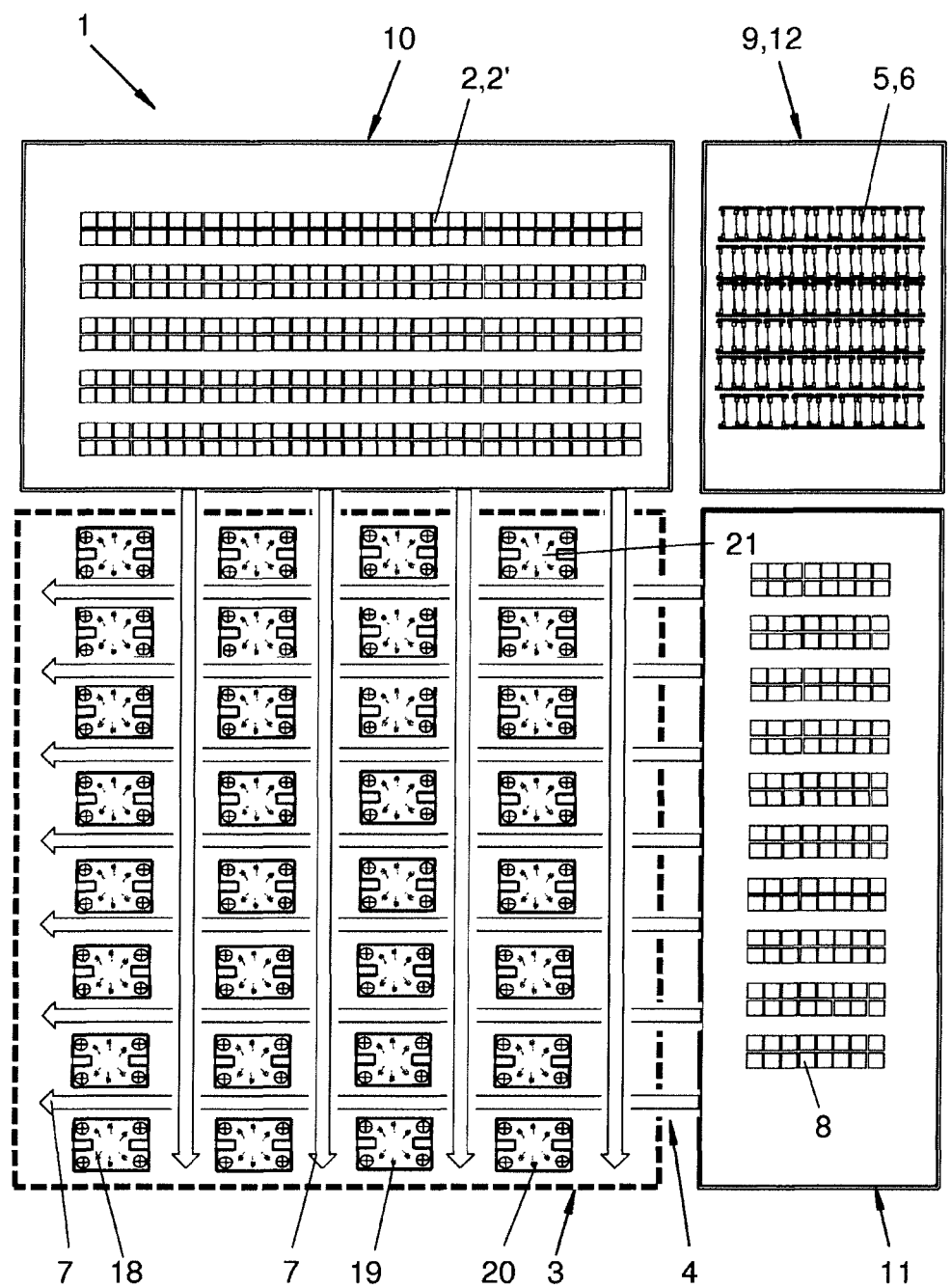
FIG. 1 is a schematic representation of a manufacturing facility with a manufacturing zone and multiple supplies.

FIG. 1 shows a schematic representation of a manufacturing facility (1) and its components. The manufacturing facility (1) comprises a manufacturing zone (3) with a plurality of manufacturing systems (18-22) arranged within it. Furthermore, the manufacturing facility (1) can include a supply (10) for workpieces (2, 2') and a supply (11) for various aforementioned tools (8). Furthermore, a conveying mechanism (4) is provided which flexibly links the manufacturing systems (18-22) to one another and to the preferably external supplies (10, 11). The supplies (10, 11) are also known as the warehouse (10) and the tool store (11).

The conveying mechanism (4) can be configured in any desired way. In the embodiments shown, it comprises a multitude of autonomous and individually controllable conveying means (5) as well as a multitude of conveying paths (7'), on which the conveying means (5) travel. The conveying paths (7) are preferably arranged in a network and intersect repeatedly.

Each conveying path (7) can extend through a manufacturing system (18-22). Multiple continuous conveying paths (7) can adjoin each other and together form a conveying line (70).

The conveying means (5) can preferably be controlled and steered, if applicable, autonomously and individually. They are configured, for example, as floor-bound driverless transport vehicles, so-called AGVs or FTFs. They can negotiate curves or possibly also turn in place. They can also possibly move omnidirectionally, e.g. by means of Mecanum wheels. Alternatively, the conveying means (5) can be suspended and can move e.g. on elevated conveying rails with diverters. They can further be configured as roller conveyors or conveyor belts. The conveying mechanism (4) can have multiple different conveying means (5).

The conveying means (5) travel in the network of the conveying paths (7') and conveying lines (70, 71) on freely programmable conveyor tracks. The conveying lines (70, 71) can be traveled in opposite directions. They can also be configured as one-way streets with opposing directions of travel indicated by arrows. Using cross-connections, in particular access corridors (66), it is possible to form conveying loops (48, 49) that also create manufacturing loops by interlinking a plurality of manufacturing systems (18-22). The manufacturing and conveying loops (48, 49) can intersect with each other.

At the one or more access corridors (66), the conveying means (5) can continue selectively along the conveying path (7) or conveying line (70) from one manufacturing system (18-22) to the other or it can turn at the cross-connection and travel to another conveying line (71). The turn can be accomplished by a steering movement of the conveying means (5) itself, by a transfer with a turntable or in another way.

A parking area (53) can be formed in the access corridor (66) or the cross-connection for temporarily stopping an empty or loaded conveying means (5). In this way, buffer storage areas can be formed to compensate for the differences in cycle times or phases of disruption as well as for sequence recovery or other purposes.

In the various embodiments, each of the conveying means (5) preferably has its own individually controllable drive and its own programmable control system. Power can be supplied in any desired manner, e.g. by means of a stationary or non-stationary power supply system (33).

For the transport of workpieces (2, 2') and/or tools (8) from the supplies (10, 11) to the manufacturing zone (3) and back and between the manufacturing systems (18-22) within the manufacturing zone (3), each of the conveying means (5) supports one or more adapted load suspension devices (6). Said devices are hereafter referred to with the abbreviation LAM.

The LAMs (6) can be fixedly or exchangeably attached to a conveying means (5). The LAMs (6) can be permanently adapted for particular workpieces (2, 2') and/or tools (8). Alternatively, they can be configured to be flexibly or adjustably differently adaptable. The LAMs (6) can have various adapted receptacles and retaining means for the workpieces (2, 2') and/or tools (8) and can hold them in a defined position. The LAMs (6) can have a plate-like or frame-like support as a base, for example.

A plurality of LAMs (6) are configured differently and form different types (A, B, C, D). They can thereby be adapted to different workpieces (2, 2'). An adjustable LAM (6) can form two or more different types. The number of different LAM types (A, B, C, D) can be arbitrarily high. It can be two, three, four or more. The number can depend upon the process volume to be completed in the manufacturing facility (1), in particular the number of different workpieces (2, 2'). There may be further LAM types for the tools (8).

The LAMs (6) of different types have a type identifier (37) for their respective types (A, B, C, D). They can be fixed or changeable. An adjustable LAM (6) can also have an adjustable type identifier (37). The type identifier (37) can be linked by information and control technology to a particular workpiece (2, 2'). It can represent the type of workpiece (2, 2') and/or tool (8). Preferably, the type identifier (37) is independent of the condition of the workpiece (2, 2') and/or tool (8) on the LAM (6). For this reason, the type identifier (37) does not change during a manufacturing process encompassing a plurality of manufacturing steps (44-47). However, the type identifier (37) can be changed for other reasons, such as in the event of a technical modification of the LAM (6).

Figure 3:
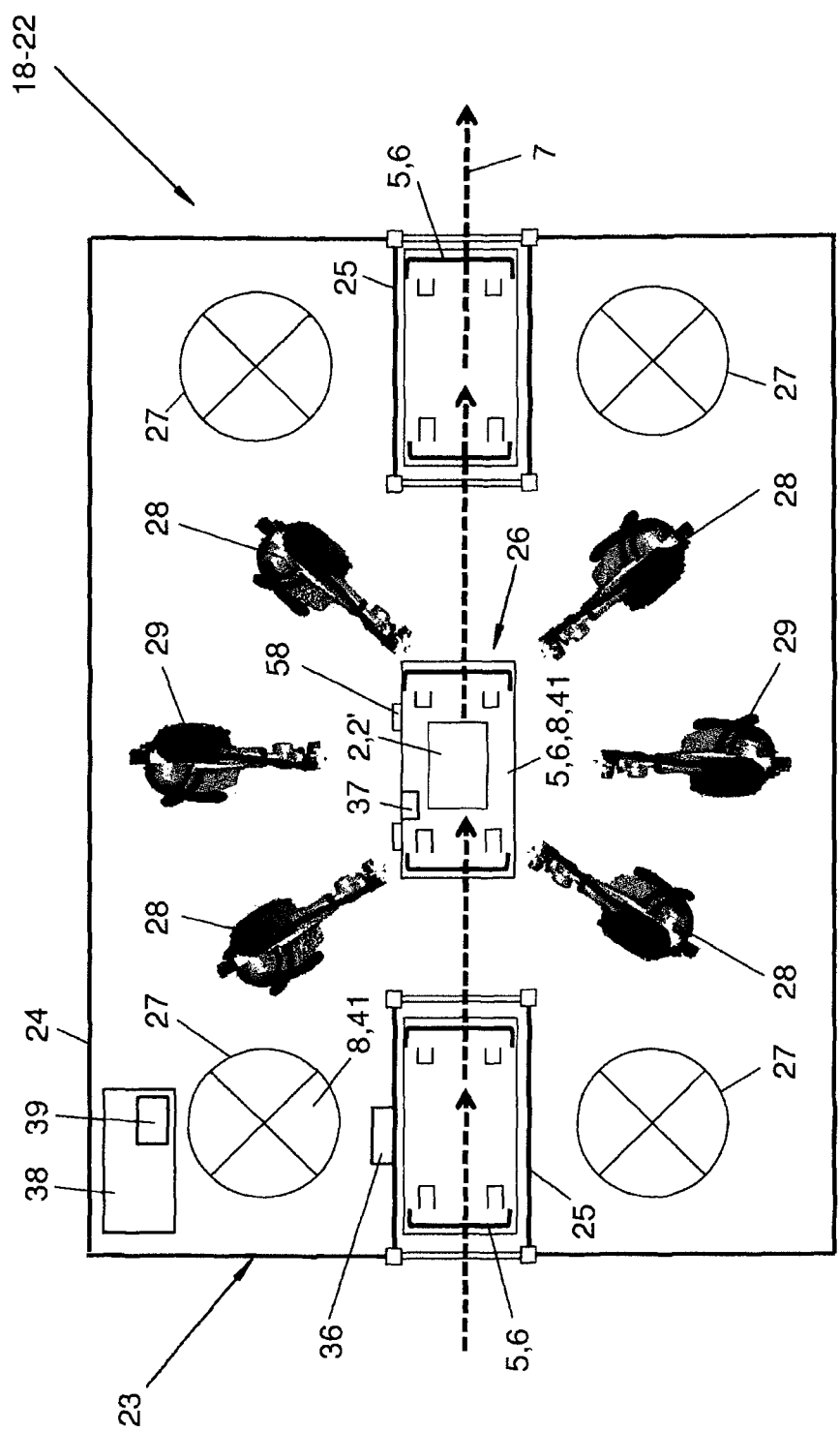
FIG. 3 is a schematic representation of a manufacturing system.

The type identifier (37) can be embodied in different ways. For instance, it can consist of encoding that is applied to the LAM (6) and that can be configured in any desired way, e.g. mechanical, magnetic, electrical, inductive, in particular as an RFID chip. The encoding can contain further information, such as an identification number of the LAM (6). Alternatively or additionally, a type identifier (37) can be formed from a color or shape feature of the LAM (6). FIG. 3 shows this arrangement.

The manufacturing facility (1) includes a supply (9) for the various LAMs (6), which is connected to the conveying mechanism (4). The supplies (9, 10, 11) can be configured identically. This kind of supply (9, 10, 11) can have a storage zone (32) for workpieces (2, 2') and/or tools (8) and/or LAMs (6) as well as a loading zone (30) that has a loading mechanism (31) and is connected to the conveying mechanism (4). The loading mechanism (31) comprises e.g. one or more loading robots, which are stationary or can be displaced by means of a driving axle along a single or a series of conveying means (5) with LAMs (6).

The plurality of manufacturing systems (18-22) are arranged in the manufacturing zone (3) in a linear or planar distribution. The conveying mechanism (4) is designed to relocate at least one type, in particular all types (A, B, C, D), of load suspension devices (6) to and from the manufacturing system(s) (18-22). The manufacturing systems (18-22) are surrounded on multiple sides by conveying paths (7). Each conveying path (7) extends into and preferably through a manufacturing system (18-22). The conveying means (5) with the LAMs (6) can thereby travel into and preferably through the individual manufacturing systems (18-22). Preferably, the manufacturing systems (18-22) are distributed in a uniform, in particular a Cartesian, matrix.

At least some of the manufacturing systems (18-22) are configured identically. Preferably, they are embodied as individual manufacturing cells (23). Alternatively, a different configuration is possible, such as a multi-cell configuration. A cell-like manufacturing system (18-22) is shown as an example in FIG. 3.

The manufacturing system (18-22) shown, in particular the manufacturing cell (23), functions automatically. It has an individual, preferably central work station and/or processing zone (26) and one or more manufacturing means or devices (28, 29) that can be applied flexibly across applications. Alternatively, a plurality of work stations and/or processing zones (26) can be provided. The processing zone (26) serves to receive at least two different kinds or types of LAMs (6) in sequence as well as the workpiece (2, 2') and/or tool (8) carried with them.

The processing zone (26) is located on a conveying path (7) that extends into or through the manufacturing system (18-22) (dead end or through street). This preferably straight conveying path (7) can be travelled in only one or preferably in both directions. In the processing zone (26), the manufacturing system (18-22) has a positioning device (58), which is shown schematically in FIG. 3, for positioning the LAM (6) and/or conveying means (5) in accordance with the process. This is followed by an exact positioning of one or more entrained workpieces (2) and/or one or more entrained tools (8).

The positioning device (58) can act mechanically upon the LAM (6) and/or the conveying means (5). In other embodiment variants, a positioning device (58) can be formed by markings in the region of the conveying path (7) that can be detected tactilely or touchlessly and that are detected by the conveying means (5) and provide for its program-controlled and self-propelled positioning. In another variant, stops that can pivot into the path of travel can be provided for the longitudinal and lateral positioning of the LAM (6) and/or conveying means (5). A positioning device (58) can also be formed by means of control technology via the programmed control of the conveying means (5) and its integrated path measurement or navigation.

The manufacturing means (28, 29) can be configured identically or differently, and there can be one or a plurality of each. At least one manufacturing means (29) serves to process a workpiece (2, 2') in the processing zone (26), in particular on the LAM (6). Additionally, the manufacturing means (29) can also handle a workpiece (2, 2'). Preferably, a different additional manufacturing means (28) is employed to handle a workpiece (2, 2').

The manufacturing means (28, 29) are distributed around the processing zone (26), for example. In particular, they are disposed to both sides of the processing zone (26) and the conveying path (7). The manufacturing means (28, 29) can be stationary or can be displaceable by means of an additional axle. The manufacturing means (28, 29), which can be used flexibly across applications, are preferably configured as programmable industrial robots with multiple axles. They have an automatic exchange coupling on their drive elements, in particular their hand flanges. In this way, they can automatically receive and use the required tool (8) or tool segment (41) and, if necessary, automatically release it and change tools. Alternatively, a manufacturing means (29) can be configured in another way, e.g. as a machine tool.

The application-flexible manufacturing means (28, 29) are preferably provided for various tasks. For example, the manufacturing means (29) have exchangeable, application-specific tools (8) for performing each respective production process, said tools being configured e.g. as a joining tool, shaping tool or the like. These manufacturing means (29) are configured as a welding robot, for instance. The other manufacturing means (28) likewise carry exchangeable application-specific tools (8) that are configured, for example, to handle the one or more workpieces (2) during the production process. These tools (8) can be gripping tools. The manufacturing means (28) are configured e.g. as handling robots.

Workpiece components can be moved and e.g. assembled during handling. Moreover, the work piece (2, 2') can be released by the LAM (6). It can thus be lifted and held in a suspended state, wherein the processing is continued, if necessary. The LAM (6) that has been separated from the workpiece (2, 2') can be moved during the further processing and can be transported away from the manufacturing system (18-22). Furthermore, the released workpiece (2, 2') can be placed on and transferred to a second LAM (6) that has been transported into the processing zone (26). The second LAM (6) can be of the same or a different type. A further workpiece can also be delivered on the second LAM (6).

The manufacturing system (18-22), in particular the manufacturing cell (23), comprises one or more storage areas (27) for said tools (8). The storage areas (27) can have multiple receiving spaces for various tools (8). They can be driven and controllable. They can be configured as storage carousels, for instance. Each of the storage areas (27) is located in the working zone of a manufacturing means (28, 29). In the embodiment shown, four storage areas (27) are arranged in the corner regions, each of which is associated with a manufacturing means (28) or handling robot.

The manufacturing system (18-22) according to FIG. 3 also comprises a control system (38) with a storage means (39) for a multitude of application-specific control programs (40) that are adapted to various LAM types (A, B, C, D). Control programs are provided and saved for at least two types (A, B), and preferably for all types (A, B, C, D), of the LAMs (6). The control system (38) itself is neutral and becomes a process manager as a result of the allocation of application-specific process segments, which will be explained below.

The manufacturing system (18-22) additionally has a detection device (36) for the type identifiers (37). The detection device (36) can be a part of the control system (38). The detection device (36) can be arranged within the manufacturing system (18-22), preferably in the inlet area. Alternatively, it can be arranged outside and e.g. on a conveying path (7).

Based on the type identifier (37) detected by the detection device (36), the control system (38) determines the type (A, B, C, D) of the LAM (6) located in the processing zone (26). The detection device (36) can comprise an optical sensor, an electromagnetic sensor, a tactile sensor, an electrical sensor and/or a magnetic sensor. In particular, a sensor can be configured as an antenna, as near-field communication or as a capacitive or inductive sensor.

The manufacturing system (18-22) and its manufacturing means (28, 29) and any further system components have a basic configuration that is application-neutral and they are adapted to the respective applications by being populated with application-specific tools (8) and being reprogrammed or by a control program (40). As a result of this basic configuration and the ability to be populated and adapted, they are flexible across applications.

Based on the detected and identified LAM type (A, B, C, D), the control system (38) selects a control program (40) from the multitude of saved programs and runs it. To this end, the control system (38) is linked with and controls the at least one manufacturing means (28, 29). A particular workpiece (2, 2') is assigned to a type identifier (37) and/or the LAM type. The selected control program (40) is adapted to the processing of this workpiece (2, 2').

The manufacturing system (18-22), in particular the manufacturing cell (23) can further comprise one or more supply systems for equipment, in particular electrical power, fluid media or the like, as well as auxiliary systems. Moreover, an encompassing protective partition (24), e.g. in the form of a fence, can be provided. One or more portals (25) can be provided in the protective partition (24) for the secured inlet and outlet of a conveying means (5) with LAMs (6) on the conveying path (7).

Figure 14:
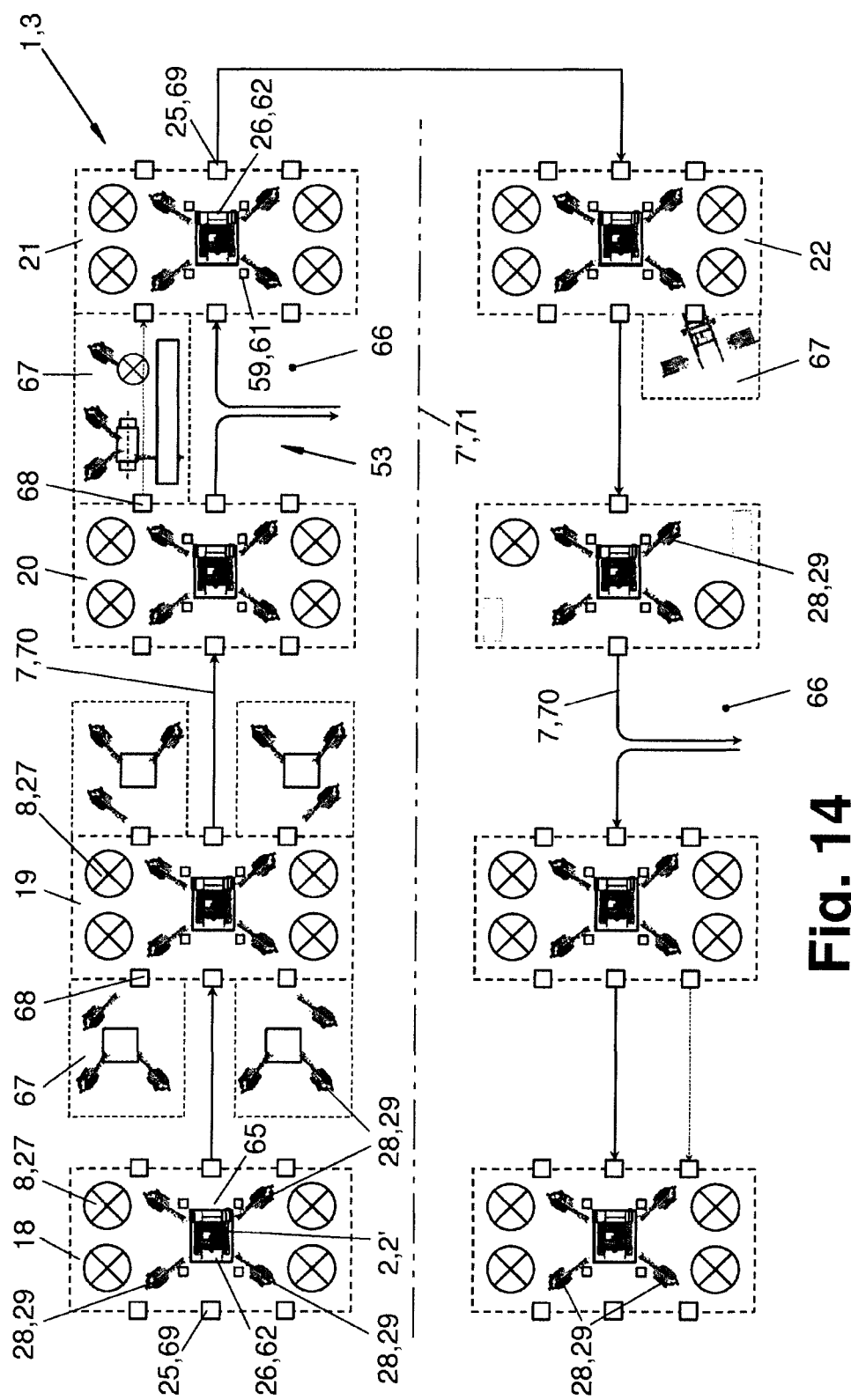
FIG. 14 is a further variant of a manufacturing facility.

As FIG. 14 makes clear, one or more application-flexible manufacturing systems (18-22) can be linked with a further manufacturing system (67) for a secondary process on a workpiece (2, 2'). A multiple arrangement of such manufacturing systems (67) is possible here. They can be arranged laterally next to or else above or below a manufacturing system (18-22). In a further manufacturing system (67), one or more program-controlled manufacturing means, in particular industrial robots, can be provided for handling and processing the workpieces (2, 2') as well as further devices, such as stationary welding tongs, bolt-driving tools, application devices for adhesive, etc.

The primary process(es) carried out in an application-specific manufacturing station (18-22) are preferably geometry-specific to the manufacturing product in question. Such processes can involve e.g. assembling and joining. A joining process can be carried out by adhering (so-called pre-process) or a geometry-determining spot welding or laser welding or with riveting or clinching or the like. The one or more secondary processes in a further manufacturing system (67) can be non-specific to geometry. They can involve e.g. joining, measuring, shaping, cutting or the like. Additional components such as bolts or the like can also be attached during joining. Furthermore, hard-coded secondary processes are possible, such as those involving punching, folding, drilling and/or milling.

The exchange of workpieces between the application-specific manufacturing system (18-22) or the one or more further manufacturing systems (67) can occur via an interface (68), which is arranged e.g. at a passage in the protective partition (24). The further manufacturing zones (67) can likewise be surrounded by a protective partition (24). The exchange of workpieces can be carried out by a program-controlled manufacturing means (28), in particular a handling robot. Further interfaces (69) can be arranged at the inlet of the manufacturing system (18-22) and at the outlet, which is preferably located opposite the inlet, and are formed e.g. by the portals (25).

Figure 2:
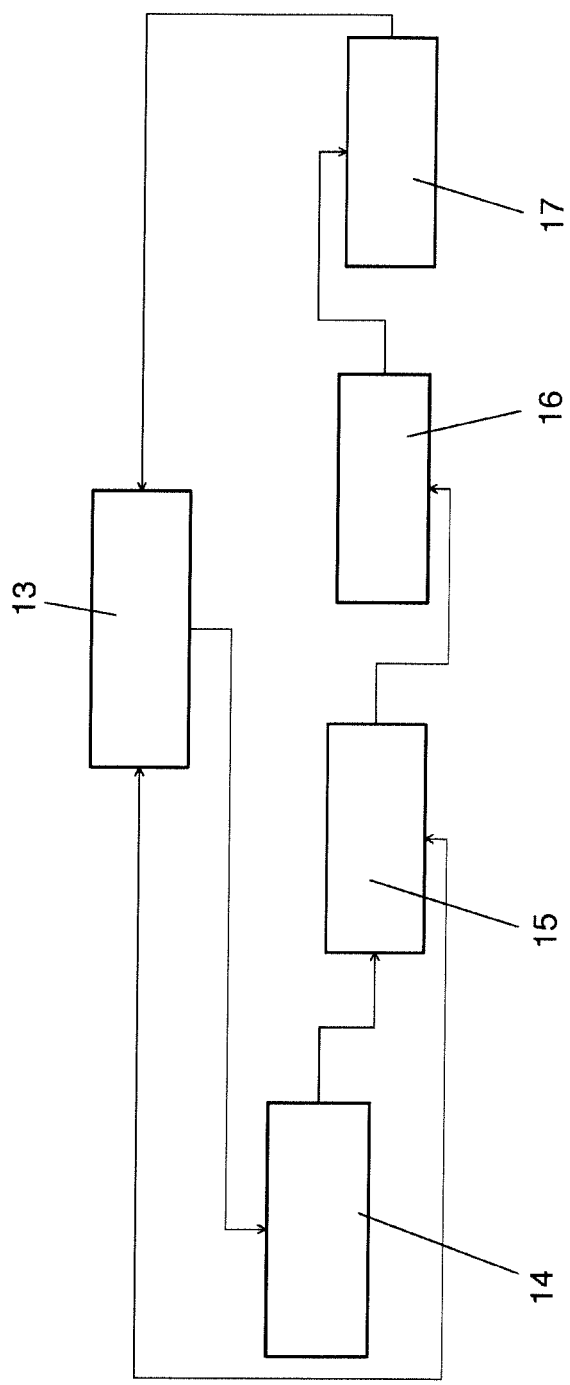
FIG. 2 is a schematic representation of a control hierarchy.

The manufacturing facility (1) has a control system (13), which is linked with control units (14-17) for the manufacturing systems (18-22), the conveying mechanism (4) and the supplies (9, 10, 11). FIG. 2 shows an example of this kind of control architecture. The central facility control system (13) is linked to a control unit (14), a so-called warehouse manager, for the warehouse (10) and the manufacturing system (18-22) and possibly also the conveying mechanism (4).

The warehouse manager (14) controls the stoppage and the displacement of the LAMs (6) in the manufacturing facility (1). In particular, it assigns the conveying mechanism (4) the tasks of transporting the various LAMs (6) to the correct address, e.g. manufacturing system or supply. It also controls the routing, i.e. the order of the manufacturing systems (18-22) visited by a LAM (6). These manufacturing systems do not have to be in direct succession, but can instead be arranged anywhere in the manufacturing facility. The routing and/or the conveyor track followed can have the LAMs pass through or around the manufacturing systems (18-22).

The warehouse manager (14) contains a warehouse management system for the control of logistics processes from the arrival to the dispatch of goods, for inventory management and inventory, for task management, for a transaction history, for adapting the warehouse configuration by means of administrators and for interfaces to system components of the manufacturing facility (1). Furthermore, the warehouse manager (14) contains a material flow system with a global control system of the automated facility components, in particular the conveying mechanism (4), for transport management, for bottleneck and flow control, for optimizing the aforementioned routing and throughput, for integrated troubleshooting over all levels, for coordination with subsystems, for facility individualization and for a global optimization of material flow.

Moreover, a link is established between the control system (13) and a control unit (15), which is called the tool store manager. There is also a link between the warehouse manager (14) and the tool store manager (15). The tool store manager (15) is concerned with the tool store (11). It includes a tool manager for logistics processes from the arrival to the issuing of tools, for the commissioning of tools for planned productions, for the administration of storage locations and deployment sites, for the control and documentation of maintenance intervals and for a history of all of the tools. Furthermore, the spare components are controlled with respect to inventory control and inventory.

The same also applies to the expendable components, so-called consumables, and to a workshop.

The tool store manager (15) is linked with a control unit (16), the so-called fleet manager. Said fleet manager comprises interfaces for logistics and material flow systems and relates to the functions of scheduling, planning and fleet management of the conveying means (5). The warehouse manager (14) also has a link to the fleet manager (16). The fleet manager (16) executes orders from both the warehouse manager (14) and the tool store manager (15).

The fleet manager (16) is linked with a further control unit (17), which is known as the field manager. The field manager is concerned with status control of the operations in the manufacturing facility (1), interfaces for hall and building services engineering as well as interfaces for quality assurance. The field manager (17) is likewise linked with the control system (13).

The control systems (38) of the manufacturing systems (18-22) and their control programs and process managers (4) are likewise linked to the facility control system (13), in particular the warehouse manager (14) and the tool store manager (15).

The aforementioned links between the control system (13) and the control units (14-17, 40) are configured as signal lines. They can be corded or cordless.

The tool store manager (15) controls the equipping of the individual manufacturing systems (18-22) and manufacturing means (28, 29) with hardware and/or software. This involves equipping the manufacturing means (28, 29) and storage areas (27) with tools (8) and transporting away the tools (8) that are no longer required by means of LAMs (6). The tool store manager (15) can also control the storage of the control programs (40) in the storage means (39) of the respective control systems (38). In particular, it can store the control programs (40) centrally and send them to the storage means (39). FIG. 10 illustrates this schematically.

The tool store manager (15) can schedule and administer the process segments that are to be executed locally in the manufacturing systems (18-22) during the production process. These process segments consist of the required tool (8) or tool segment (41) and the associated program sequences or tool segments (42) in the control program (40). The type-dependent call-up and execution of the control program (40) are performed by the respective control system (38). The use and possible exchange of tools (8) or tool segments (41) can also be controlled by the control program (40).

The processing of each single- or multi-component workpiece (2, 2') in a production process and a series of multiple manufacturing steps or manufacturing segments (44-47) is controlled autonomously in the manufacturing systems (18-22) by the respective selected control program (40). The production process and step sequence of the process segments as well as their addresses in the manufacturing facility (1) are administered by a warehouse manager (14) and controlled by displacing the load suspension devices (6) and conveying mechanisms (4). The control of the manufacturing facility (1) is therefore decentralized.

The control systems (38) and their process managers (40) report to the warehouse manager (14) the beginning and end of a manufacturing process or process segment. The warehouse manager (14) then appropriately controls the conveying mechanism (4) for the further transport of the respective LAM (6) to the next manufacturing system (19-22) in the production process or to a supply (9, 10, 11, 12) and to the working zone (26) for the delivery of the next LAM (6).

The manufacturing facility (1) with the manufacturing zone (3) and the supplies (9-12) as well as the conveying mechanism (4) can be configured in any desired way. In this way, different workpieces (2, 2') can be produced in a parallel operation. This can include the parallel manufacture of left and right side walls, a vehicle roof, a floor assembly or the like. The same also applies to other types of workpieces (2, 2') that are not configured as components of the vehicle body. Furthermore, any desired mix of different types of identical workpieces (2, 2') can be manufactured within these parallel manufacturing operations.

All of the manufacturing systems (18-22) can carry out different manufacturing processes and manufacturing steps. For instance, a separate manufacturing system (18-22) can be provided for every workpiece-related manufacturing step (44-47). However, the same or similar manufacturing steps can also be performed on multiple different workpieces (2, 2') in a manufacturing system (18-22). Moreover, it is possible to perform a manufacturing step for a particular workpiece (2, 2') in parallel in two or more functionally equivalent manufacturing systems (18-22). This can be sensible, for example, in order to balance cycle times of different lengths for different manufacturing steps. In addition, it is possible to decrease or increase the manufacturing capacities and the number of the manufacturing systems (18-22) that are involved.

As a result of the quick application-specific adaptation of the manufacturing facility (1) and in particular the manufacturing systems (18-22), the individual application-related manufacturing jobs of the manufacturing systems (18-22)

can be modified flexibly and quickly. The required reconfiguration of the tools as well as the reprogramming and application-specific adaptation of the manufacturing systems (18-22) brought about by it can likewise be carried out very quickly and easily. The conveying mechanism (4) and its conveyor tracks can be modified and reprogrammed just as quickly.

Figure 4:
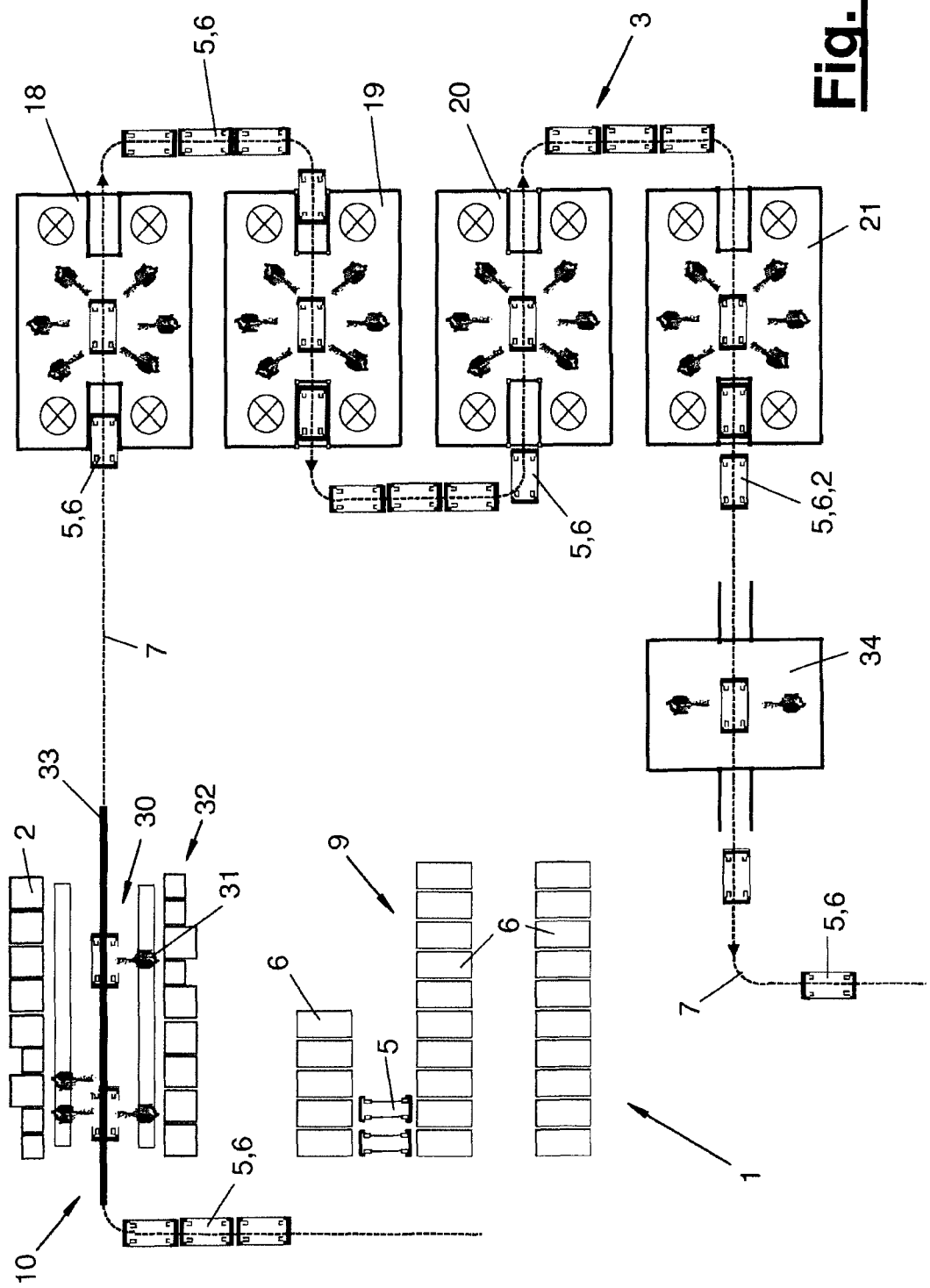
FIG. 4 is an exemplary representation of a manufacturing zone with a plurality of manufacturing systems and supplies.

FIG. 4 illustrates an exemplary configuration of a manufacturing facility (1) with a manufacturing zone (3), in which four manufacturing systems (18-21) are arranged in a row and through which a conveying path (7) passes consecutively. The manufacturing system (18-21) can be configured in the manner according to FIG. 3. After passing through the last manufacturing system (21), the conveying means (5) with the LAM (6) and the finished workpiece (2) can move into a delivery zone (34), in which the workpiece (2) can be unloaded by robots or the like and transferred away from this area of the manufacturing facility (1). It can be brought to an intermediate storage facility or delivered directly to a further manufacturing zone (3).

FIG. 4 also illustrates the warehouse (10), which is upstream of the manufacturing zone (3) and in which the conveying means (5) and LAMs (6) are loaded with one or more workpieces (2, 2') and subsequently driven into the manufacturing zone (3). Additionally, a supply (9) for LAMs (6) and a supply (12) for conveying means (5) are located upstream and are linked to the warehouse (10) and the manufacturing zone (3) via a conveying path (7).

Figure 5:
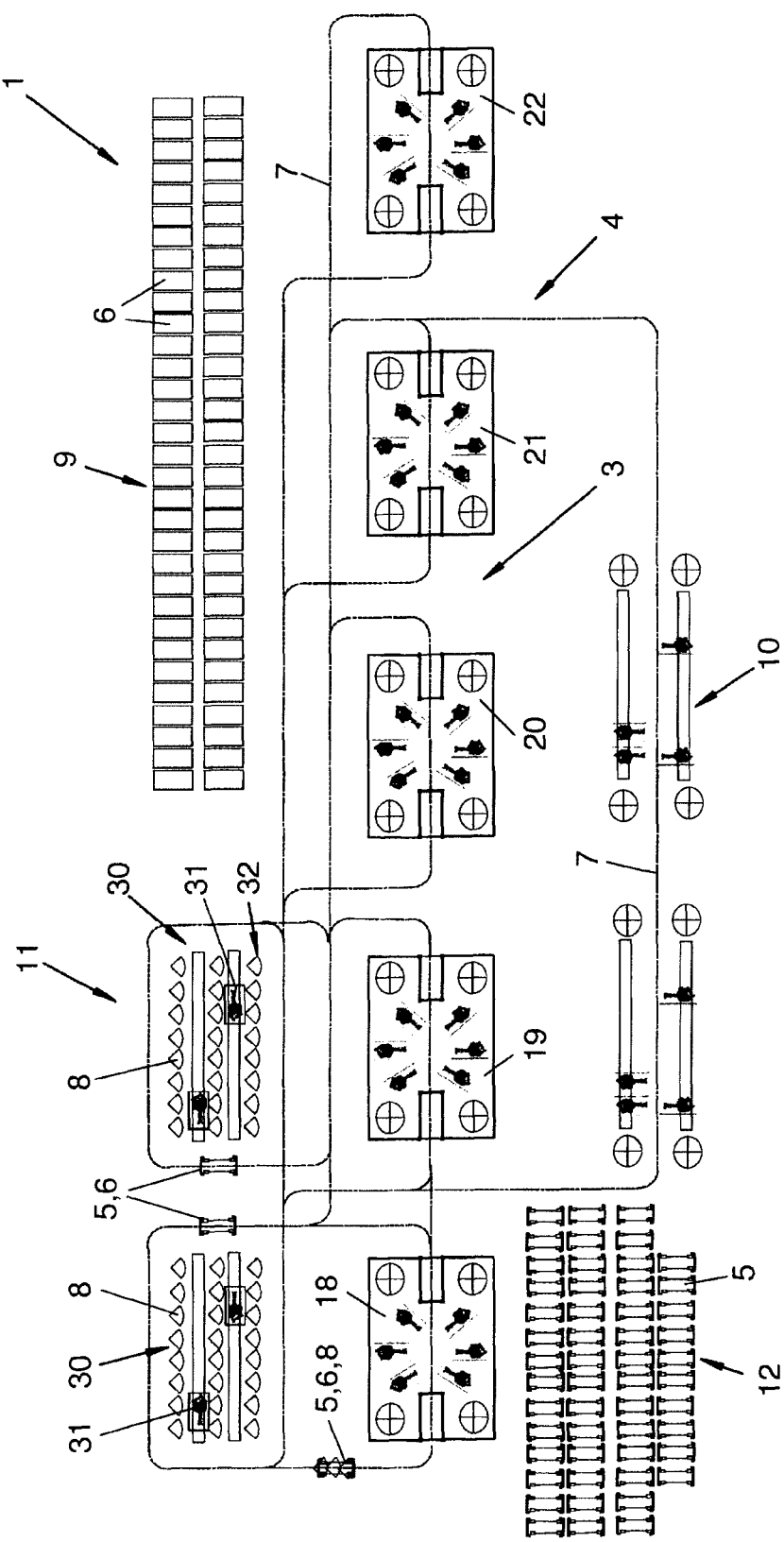
FIG. 5 is a different example of a manufacturing zone with supplies for equipping and switching the tools of the manufacturing system.
Figure 6:
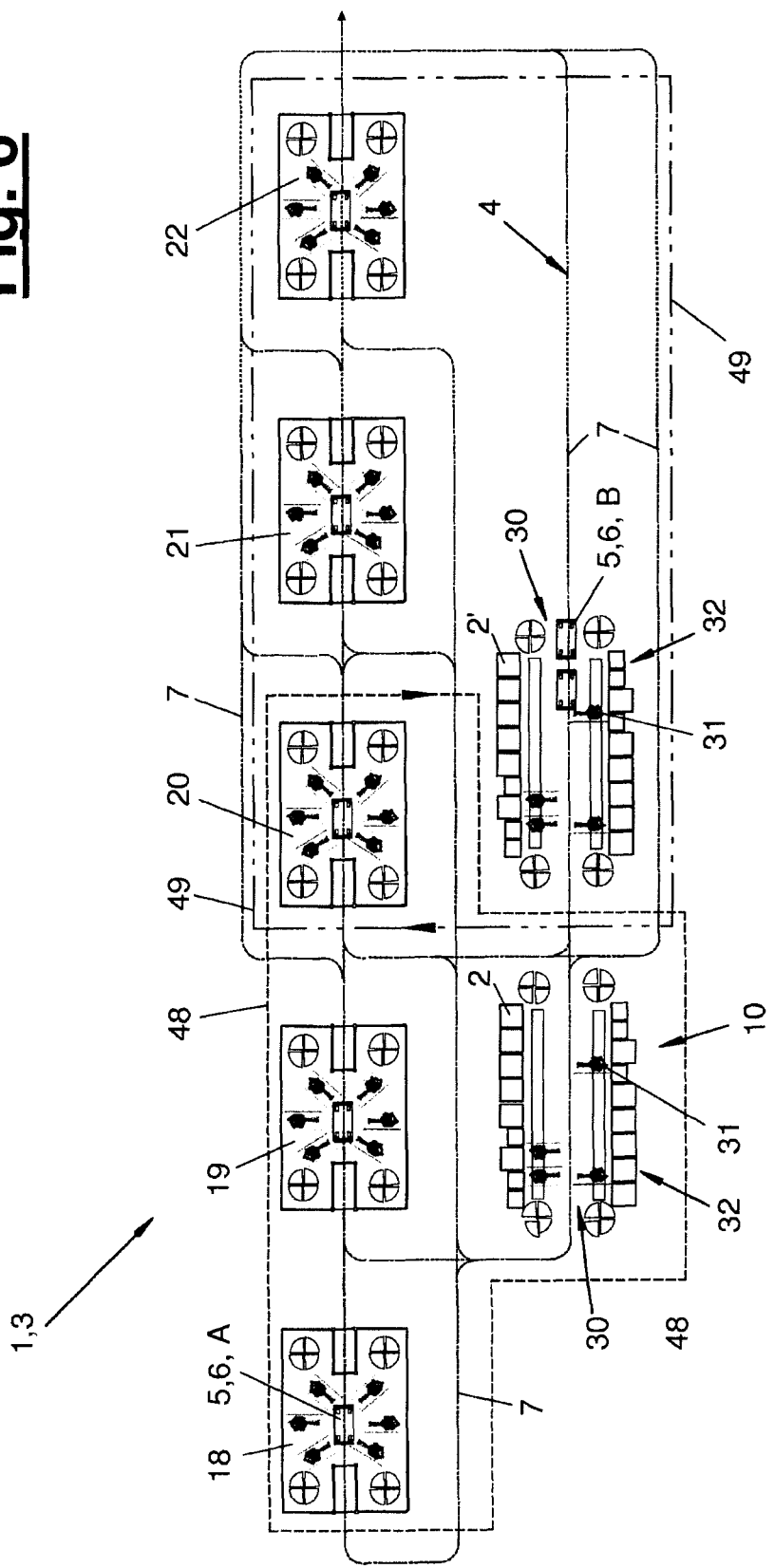
FIG. 6 is a different partial view of the manufacturing zone shown in FIG. 5 for processing with a supply for workpieces.

FIGS. 5 and 6 show examples of a different configuration of the manufacturing facility (1) with a manufacturing zone (3), which has a row of five manufacturing systems (18-22). FIG. 5 thus illustrates the application-specific preparation and equipping of the manufacturing zone (3).

The conveying means (5) from a supply (12) are first loaded with appropriate LAMs (6) and then travel to a tool store (11), which can have one or more loading zones (30). Here, the required application-specific tools (8) are loaded onto the conveying means (5) and LAMs (6), which subsequently travel on programmed conveyor tracks into the respective manufacturing systems (18-22) and there transfer the tools (8) to the manufacturing means (28, 29) and, if necessary, the storage areas (27). A reprogramming in the control unit of the respective manufacturing system (18-22) is additionally carried out. The equipping can take place in a parallel operation.

The tools (8) can be unloaded in the manufacturing systems (18, 22) by means of the manufacturing means (28, 29) located there, wherein those tools (8) that are no longer needed are transferred to the conveying means (5) and the LAM (6) during the exchange.

In a different variant that is not shown, a handling mechanism can be arranged on the conveying means (5) and/or the LAM (6) to equip the tools, said mechanism carrying out the tool exchange and the re-equipping with tools (8). This handling mechanism can be a multi-axle handling robot, for example. Tools (8) and/or other devices can therefore be placed outside of the conveying or passage path (7).

Once a successful application-specific re-tooling or equipping of the manufacturing zone (3) has been completed, the manufacturing process can begin. FIG. 6 illustrates this stage. The various programmed conveyor tracks of the conveying means (5) thus change within the network of conveying paths (7). In FIGS. 5 and 6, said programmed conveyor tracks on the available conveying paths are indicated with reference sign 7.

The warehouse (10), which can likewise have two or more loading zones (30), is linked with the manufacturing zone (3) via the conveying mechanism (4). Depending on the manufacturing process, different workpieces (2, 2') can be transported to the different manufacturing systems (18-22). The manufacturing systems (18-22) can again be configured in the manner according to FIG. 3.

In a production process schematically depicted in FIGS. 8, 9 and 10, a conveying means (5), together with type D LAMs (6) and a workpiece (2) that is configured e.g. as a component set, travels from a loading zone (30) into the first manufacturing system (18). After the type detection, a process segment is carried out in the first manufacturing system (18) in a first manufacturing step (44), e.g. the assembling and joining of workpiece components.

The manufacturing means (28) or handling robots remove the workpiece components from the LAM (6) by means of suitable tools (8), in particular geo grippers. The manufacturing means (28) cooperate with each other here and interlock their geo grippers, if necessary, and then present the gripped and tensioned workpiece components to the one or more manufacturing means (29), in particular welding robots, for joining. If necessary, locked geo grippers are placed in further working positions as a group. Moreover, one or more further workpiece components from one or more manufacturing means (28) can subsequently be delivered by the LAM (6) as needed and can be added to the already gripped workpiece components. After the joining process, the workpiece that has been produced is placed back onto the conveying means (5) and/or the LAM (6) and then transported away from the manufacturing system (18). In the manufacturing system (18), the gripped workpiece components are subjected to laser welding with a remote laser, for example, wherein the partially joined workpiece (2) at the end of the manufacturing step (44) has a status 1.

After the second manufacturing step (45) in the following manufacturing system (19) and the individual process segment there with a further attached workpiece component, the workpiece (2) has a status 2. After the third manufacturing system (20) and the third manufacturing step (46) with a process segment, the workpiece (2) has a status 3. In the fourth manufacturing system (21) and during the fourth manufacturing step (46) with two process segments, the workpiece (2) or the finished product (43) is completed in the form of an assembly with status 4 and is transported away.

According to FIGS. 8 and 9, a second workpiece (2') on a type C LAM (6) can likewise be moved though the manufacturing systems (18-22). After the type detection, for example, a production process with two process segments takes place only in the first manufacturing system (18). No processing takes place in the second, third and fourth manufacturing systems (19, 20, 21). There is no associated control program (40) and no process segments here. The remaining production process extends to other manufacturing systems, if necessary.

In this variant, the workpieces (2, 2') are processed and transported in parallel and independently of each other. The respective workpieces (2, 2') can pass through or around manufacturing stations (18-22) where no processing will take place.

In another variant, the workpiece (2) as a whole can be removed by the LAM (6) during a production process or process segment in a manufacturing system (18-20), wherein the conveying means (5) with the empty type A LAM (6) exits the manufacturing system, and a new conveying means (5) with a tape B LAM (6) enters, wherein the finished workpiece (2) is then deposited here and transported further.

During this exchange or transfer process, the finished workpiece (2) can be loosely supplemented or joined with a further workpiece (2') or workpiece components, possibly manufactured in different ways, which are delivered on the other type B LAM (6). This LAM (6) is adapted to receive both workpieces (2, 2') or workpiece components. The manufactured workpiece (2) can be placed on the LAM (6) in the correct relative position to the further workpiece(s) (2') or workpiece components. Moreover, further processing of the assembled workpieces (2, 2') or workpiece components, such as joining, can take place. The control program (40) for the first LAM type A can have an additional program sequence for this purpose or can be switched as a result of the type detection of the incoming second type B LAM.

The assembled and possibly joined workpiece configuration can then be transported into the next manufacturing system. These manufacturing and transfer processes can be repeated, wherein a complex workpiece, such as a front end assembly of a vehicle body, is produced from individual parts and with e.g. four different LAM types (A, B, C, D), which are adapted to the intermediate products.

For the workpiece transfer, type A LAMS and type B LAMS pass through the manufacturing system (21) in question in immediate succession and in a predetermined order or sequence. Owing to a corresponding number of such transfers, the interlinking conveying technology is ensured throughout the cross-system production process.

It is also possible that a conveying means (5) with a type A LAM (6) and a workpiece (2) produced in a manufacturing step are initially transported back to the warehouse (10) from a manufacturing system (18) and supplemented there with further workpieces or workpiece components and subsequently transported into the next manufacturing system (19). Corresponding processes can also accompany the further manufacturing steps and manufacturing systems (20-22).

Each type (A, B, C, D) of LAM (6) can be transported in a closed manufacturing loop (48, 49) on correspondingly programmed, preferably ring-like, closed conveyor tracks. The manufacturing loop (48, 49) extends via one or more associated manufacturing systems (18-22) and possibly through the supplies (9, 10). The manufacturing loop (48, 49) corresponds to the manufacturing process for a workpiece (2, 2') and the manufacturing steps (44-45) provided for it to produce a manufactured or intermediate product (43). The number of incorporated manufacturing systems (18-22) can thus correspond to the number of manufacturing steps (44-45).

The manufacturing loops (48, 49) can run separately from each other and possibly in parallel in some sections. During further processing of the finished or intermediate product (43) in a subsequent further production process with its own manufacturing loop (49), the two manufacturing loops (48, 49) can intersect in a common manufacturing system (21).

FIG. 6 schematically illustrates examples of two manufacturing loops (48, 49). The first manufacturing loop (48), shown in dashed lines, for one or more type A LAMs (6) and workpieces (2) extends via three manufacturing steps and three manufacturing systems (18-21) and the supply (10). The first manufacturing loop (49), shown in dot-dashed lines, for one or more type B LAMs (6) and workpieces (2') extends via three manufacturing steps and three manufacturing systems (18-21) and the supply (10). The manufacturing loops (48, 49) intersect in the manufacturing system (21), wherein the aforementioned transfer of the workpiece (2) or the finished or intermediate product (43) from the type A LAM (6) to a different type B LAM (6) takes place here.

Figure 7:
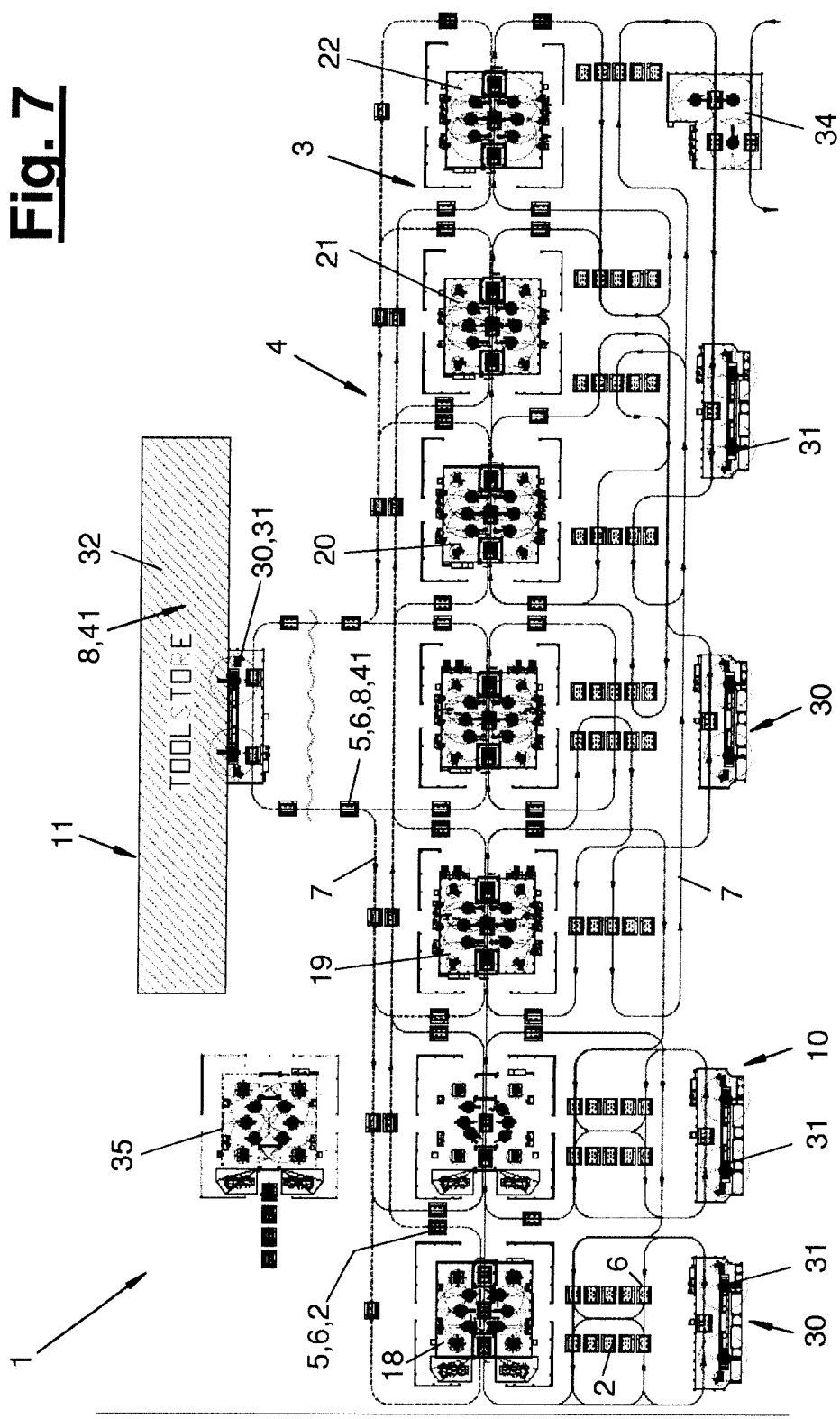
FIG. 7 is a further variant of a manufacturing facility.

FIG. 7 shows a further, more complex configuration of a manufacturing facility (1) with a manufacturing zone (3) of the type described above, a warehouse (10) and a tool store (11). For the sake of clarity, the other supplies (9, 12) are not shown. The warehouse (10) and the tool store (11) can be arranged on opposite sides of the manufacturing zone (3), wherein e.g. a single row of manufacturing systems (18-21) is located. An arrangement such as this has the advantage that the conveying means (7) and the programmed conveyor tracks can be segregated for the tool exchange and for the workpiece supply. Moreover, a variant is presented in which buffer storage areas for loose LAMs (6) with prepared workpiece configurations (2) are assigned to the various loading zones (30) of the warehouse (10). The conveying means (5) used to transport workpieces from and to the manufacturing systems (18-22) then load only the prepared LAMs (6), wherein other conveying means (5) are responsible for equipping the buffer storage area. This ensures particularly fast exchange and equipping times.

Apart from the aforementioned types of application-flexible manufacturing systems (18-22), a manufacturing zone (3) can also have one or more other manufacturing systems (35), which contain e.g. a predetermined complement of tools and a predetermined manufacturing step, which is not or only somewhat flexible. The manufacturing system (35) is shown in this way in FIG. 7. It can be configured as a geo station or framing station for vehicle bodies, for example, and can have a pair of clamping frames that can be exchanged repeatedly and in place, if required.

Inflexible or less flexible manufacturing systems (35) such as these can be employed for particularly large and heavy workpieces or workpiece configurations. Otherwise, they can exhibit the same properties as the application-flexible manufacturing systems (18-22), in particular application-flexible manufacturing means (28, 29), storage areas (27), etc. Furthermore, they can also be attached to the conveying mechanism (4) and can have a continuous conveying path (7).

A manufacturing system (35) can be configured as a try-out station, for instance, which serves to develop a new application. It can correspond to the uniform and standardized manufacturing systems (18-22) in its basic design, wherein a production process and a control program (40) are established and tested here using application-specific tools (8).

Figure 11:
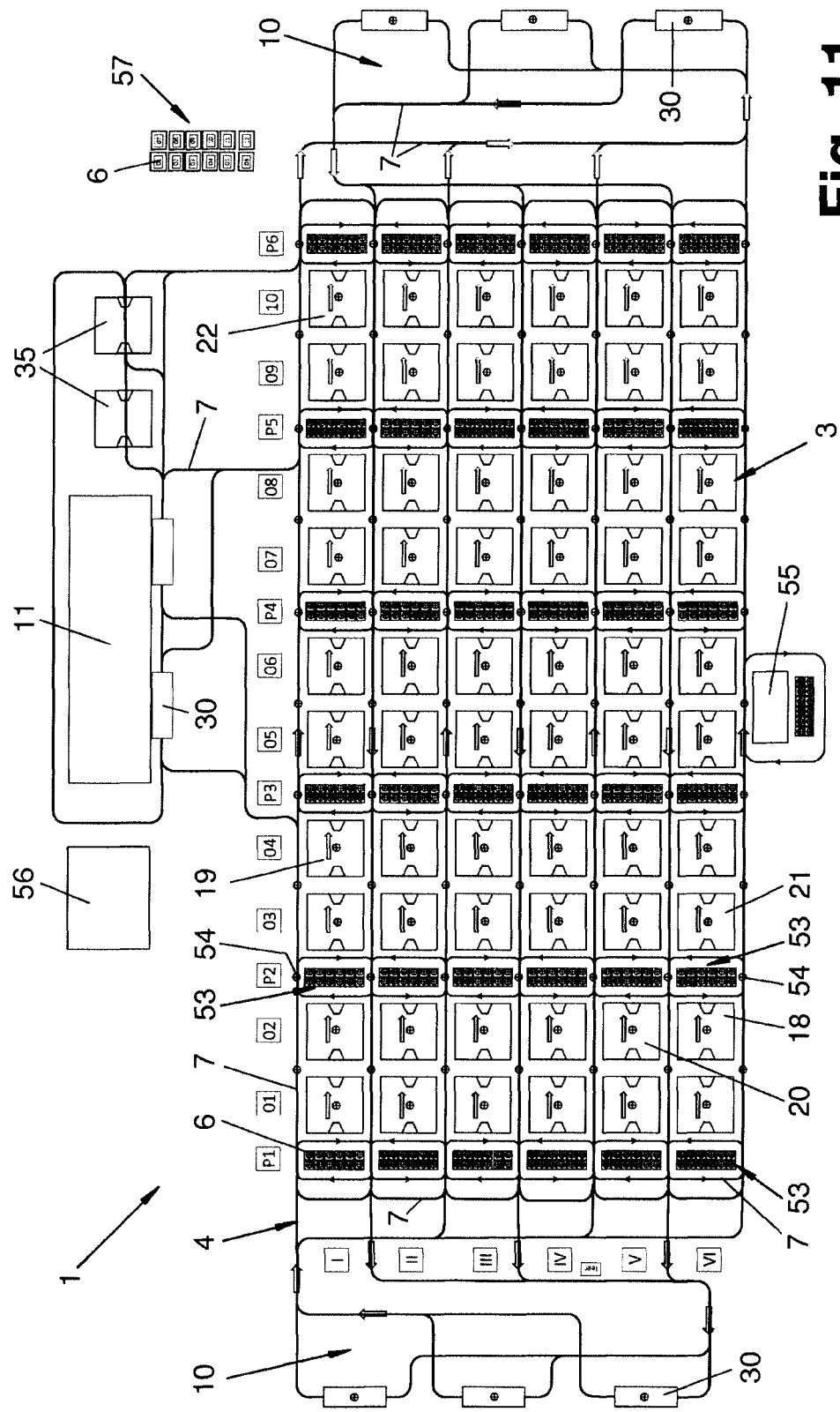
FIG. 11 is a further variant of a manufacturing facility.

FIG. 11 shows a further variant of a manufacturing facility (1) with a manufacturing zone (3) and supplies (10, 11) for workpieces and application-specific tools. A LAM configuration zone (56) is associated with the tool store (11). A repair zone (55) is arranged at the edge of the manufacturing zone (3). The manufacturing facility (1) shown also contains two or more separate manufacturing systems (35), which are configured e.g. as try-out stations and are arranged close to the tool store (11). Additionally, an intermediate storage area (57) can be provided at the end of the manufacturing facility (1), at which the end products are deposited by the LAMs (6) and are possibly loaded onto other conveyors, in particular skids. A painting line can follow, wherein a painting sequence can also be established.

The manufacturing system (18-21) is arranged within the manufacturing zone (3) in a Cartesian matrix with six rows (I-VI) and ten columns (01-10). The conveying mechanism (4) and its conveying paths (7) extend between and along the rows (I-VI) and link them with the warehouses (10) located to the left and right. There can be one-way traffic with two or more lanes for the conveying means (5), which are not shown, on these main conveying paths (7). The one-way direction alternates by row. The main conveying paths (7) are also linked transversely, in particular to the outer edges of the facility and in the warehouse area. Moreover, said conveying paths (not shown) go into or through the manufacturing system (18-21).

In the manufacturing facility (1) in FIG. 11, the total material flow of workpieces (2, 2') can be divided into manufacturing micro-loops so that the necessary overall sequence depends only upon the order of two LAMs (6) and conveying means (5), which are dispatched by the warehouse manager (14) into the next respective manufacturing system (18, 22). Parking zones (53), in which one or more empty or loaded LAMs (6) can be parked temporarily, are arranged at various points between manufacturing systems (19, 20) In rows (I-VI), e.g. two manufacturing systems (18, 19) are combined into a block, wherein each of the blocks is separate from a parking zone (53). The parking zones (53) are each surrounded in a ring shape by tributary conveying means (7). Right-of-way rules can be established on the main and tributary conveying means (7).

In the case of interlinked micro-loops that overlap in the manner described above, the transfer process requires that the LAMs (6) must drive into a common manufacturing system in a particular order. This order is generated and ensured in the parking zone (53). For this purpose, there is a position (54) that is defined as a temporary address for the LAMs (6) on one of the main conveying paths (7) between the rows (I-VI) in the parking zones (53).

Figure 12:
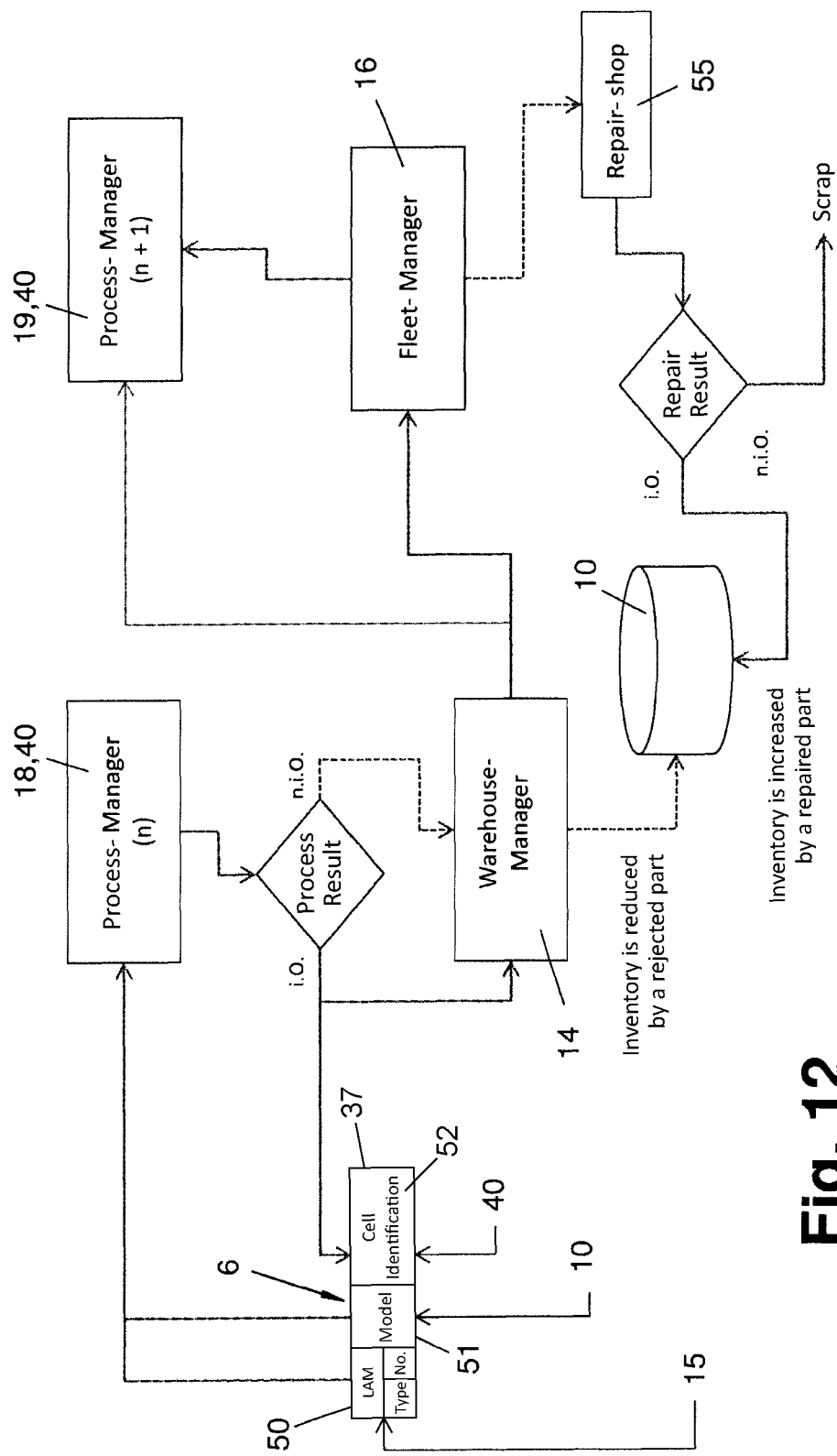
FIG. 12 is a building block in a control and manufacturing process.
Figure 13:
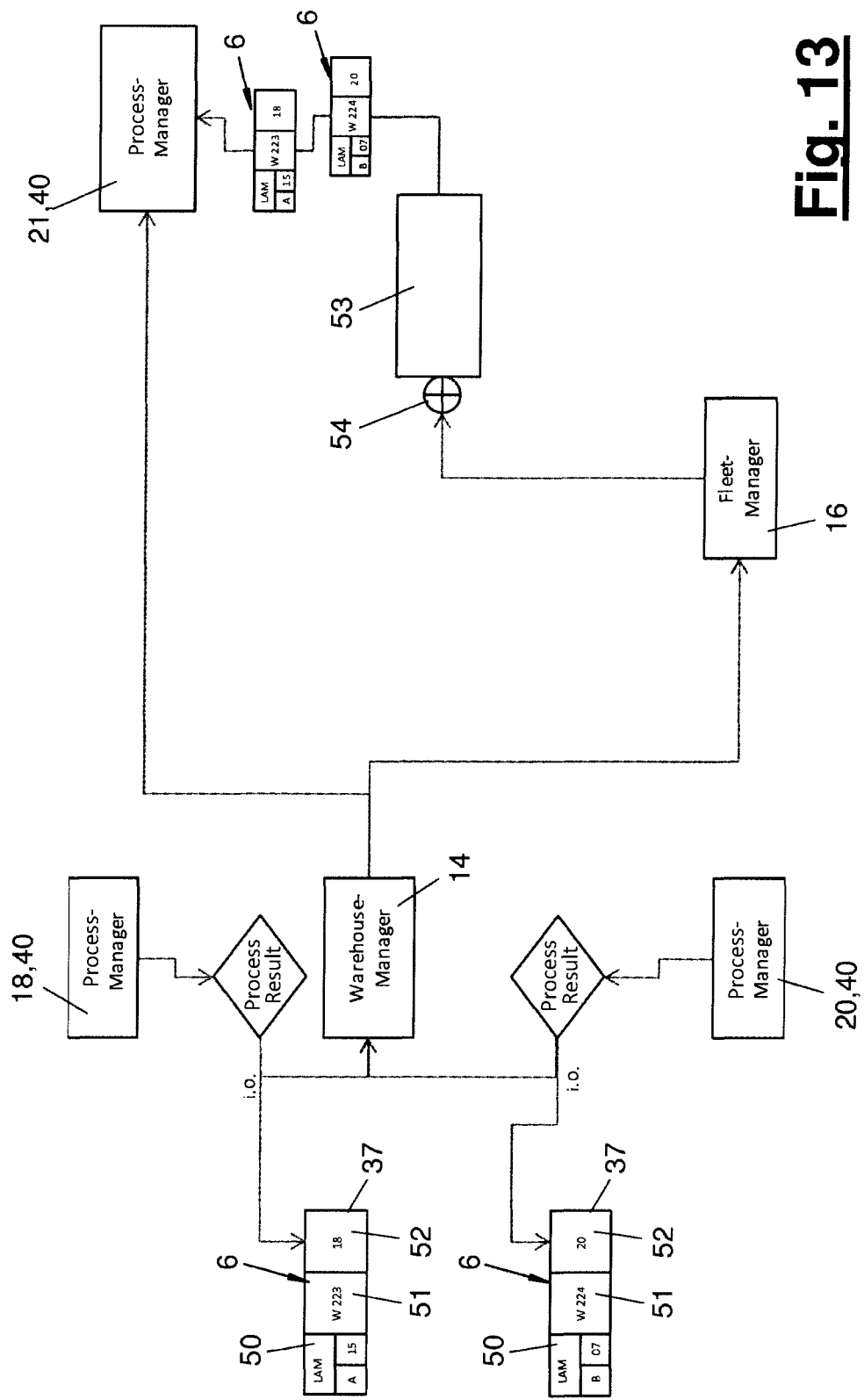
FIG. 13 is a different building block in a control and manufacturing process with a parking zone.

As FIGS. 12 and 13 illustrate, a type identification (37) can be configured as encoding and can contain multiple identifier fields (50, 51, 52) for various information or data. A first identifier field (50) can be provided for the LAM type, for instance. It can be in two parts and can also contain a LAM-specific indication of identification. The identifier field (50) can be described by the tool store manager (15), which occurs e.g. in the LAM configuration zone (56).

The second identifier field (51) can contain an indication of the model or the specific workpiece (2, 2'). This identifier field (51) can be described e.g. in the warehouse (10) during loading.

A third identifier field (52) can contain a cell identifier or an identifier of the manufacturing system (18-22) most recently visited. This identifier field (52) is described e.g. by the process manager (40) of the respective manufacturing system (18-22). The identifier field (52) is updated in every manufacturing system (18-22), FIG. 12 shows an example of a section or building block or a control and manufacturing process. Here a production process is carried out in a first manufacturing system (18) e.g. in the manner described above after the detection of the type identifier (37), wherein the process manager (40) then transmits a message about the process result to the warehouse manager (14). If the process result is correct, the identifier field (52) with the cell identifier is described and the LAM (6) is dispatched by the warehouse manager (14) to the next manufacturing system (19) provided in the production process. This can be carried out by the fleet manager (16). Furthermore, in order to accelerate the equipping process, the warehouse manager (14) sends the process manager (40) of the next manufacturing system (19) a message about the impending arrival of the next LAM (6) and its type (A, B, C, D). During a change of LAM type, a re-equipping process, in particular a tool exchange, can already take place during the transport time and can overlap with it. Finally, the production process and a subsequent report of the process result to the warehouse manager (14) and updates of the identifier field (52) take place in the manufacturing system (19). As described above, the LAM is then transported further in the current production process.

If a process result is incorrect, the LAM (6) with the workpiece (2, 2') is transported to the repair zone (55). The warehouse manager (14) arranges this by means of the fleet manager (16). Said fleet manager also appropriately informs the process manager (40) of the next manufacturing system (19) if necessary. The warehouse manager (14) also reduces the workpiece inventory in the supply (10) by the defective workpiece. A repair of the workpiece (2, 2') and the process error is attempted in the repair zone (55). If the repair result is correct, the inventory in the warehouse (10) is raised again to account for the repaired component or the repaired component can possibly be channeled directly back into the production process. If an unsatisfactory repair result occurs, the component is scrapped.

FIG. 13 shows a further aspect or building block in the cross-system control and production process in conjunction with the aforementioned parking zone (53) according to FIG. 11. Different workpieces are processed on different LAMs (A, B) in the manufacturing system (18, 20). The further processing and transfer of a workpiece from a TYPE (A) LAM to a type (B) LAM should take place in the next manufacturing system (21). The warehouse manager (14) informs the process manager (40) of the manufacturing system (21) of the next processing job and the arrival sequence of the LAMs (6). The type (A) LAM must enter the manufacturing system (21) before the type (B) LAM in this case.

The two LAMs (A, B) must first travel to the parking zone (53) upstream of and assigned to the manufacturing system (21). The warehouse manager (14) arranges this by means of the fleet manager (16). The type (A) and (B) LAMs (6) first drive to the position (54) as a temporary address. From here, the ultimate destination is established by the following criteria. This destination can be the assigned manufacturing system (21) if no previous LAM of the arriving type (A, B) is in the waiting position upstream of this manufacturing system (21). In this case, the manufacturing system (21) is driven directly to the parking zone (53) without any intermediate stops. Owing to the type sequence that must be observed, the type (A) LAM can also be driven directly to the manufacturing system (20) if the other type (B) LAM is currently located in one of the spaces in the parking zone (53) and must be passed. This involves a sequence recovery, should the LAM types (A, B) arrive at the position (54) in the wrong order. The parking zone (53) is set as the destination for type (B) when type (B) arrives before type (A) in the wrong order and needs to be passed by the latter in the way described above for a sequence recovery. Additionally, the parking zone (53) is allocated as a destination when preceding LAM types (A, B) for the manufacturing system (21) are already in the waiting position. In this case, the parking zone (53) is filled up as an availability store. In so doing, it can e.g. form a buffer for any process disturbances or other delays that may occur in the production or manufacturing process.

Various modifications to the embodiments shown and described are possible. In particular, the features of the different embodiments and their variants can be combined in any given way, including interchanged.

In one variant, the manufacturing steps (44-47) can take place in a single manufacturing system (18-22). One and the same manufacturing system can be involved in multiple activities within the manufacturing process. It is also possible to use one and the same manufacturing system of two or more different but synchronous manufacturing processes. A further variant provides for a central control system of the manufacturing systems (18-22) via the facility control system (13), wherein a type detection of the LAMs (6) can be omitted or can be used for verification purposes.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS

1 Manufacturing facility
2 Workpiece
2' Workpiece
2" Workpiece
3 Manufacturing zone
4 Conveying mechanism, Fleet
5 Conveying means, AGV
6 Load suspension device (LAM)
7 Conveying path
8 Application-specific tool
9 Supply for load suspension device (LAM)
10 Supply for workpieces, warehouse
11 Supply for tools, tool store
12 Supply for conveying means
13 Control system
14 Control unit, warehouse manager
15 Control unit, tool store manager
16 Control unit, fleet manager
17 Control unit, field manager
18 Manufacturing system
19 Manufacturing system
20 Manufacturing system
21 Manufacturing system
22 Manufacturing system
23 Manufacturing cell
24 Protective partition
25 Portal
26 Work station, processing zone
27 Storage area, storage carousel
28 Manufacturing means, robot, handling robot
29 Manufacturing means, robot, welding robot
30 Loading zone
31 Loading mechanism, loading robot
32 Storage zone
33 Power supply system, energy charging path
34 Delivery zone
35 Manufacturing system
36 Detection device
37 Type identifier, encoding
38 Control system
39 Storage means
40 Control unit, control program, process manager
41 Tool segment, hardware tool, tool
42 Tool segment, software tool, program component
43 Finished product
44 Manufacturing step, manufacturing segment
45 Manufacturing step, manufacturing segment
46 Manufacturing step, manufacturing segment
47 Manufacturing step, manufacturing segment
48 Manufacturing loop, type A
49 Manufacturing loop, type B
50 Identifier field
51 Identifier field
52 Identifier field
53 Parking zone
54 Position
55 Repair zone
56 LAM configuration zone
57 Intermediate storage area
58 Positioning device (LAM)
59-65
66 Access corridor
67 Manufacturing system, secondary process
68 Interface
69 Interface
70 Conveying line, outbound path
71 Conveying line, inbound path
72 Logistics zone
A type LAM
B type LAM
C type LAM
D type LAM

What is claimed is:

1. A manufacturing facility for workpieces, comprising:
a workpiece supply;
at least one automatic manufacturing system for workpieces; and
at least two different types of load suspension devices, each load suspension device having a type identifier;
wherein the automatic manufacturing system comprises:
at least one program-controlled manufacturing means,
a processing zone configured for the sequential receipt of at least two load suspension devices of different types,
a detection device configured to detect a type identifier of one of the load suspension devices, and
a control system configured to determine the type of load suspension device based on the type identifier detected by the detection device and to select and run a control program for the at least one manufacturing means from among a plurality of control programs on the basis of the determined type;
wherein the type identifier is configured as encoding and contains additional information and data in addition to indicating the type and a plurality of identifier fields being provided for containing the information or data;
the manufacturing facility further comprising a conveying mechanism configured to relocate at least one type of the load suspension devices to and from the manufacturing system;
wherein the conveying mechanism has at least one conveying means configured as an autonomous, steerable, floor-bound driverless transport vehicle (AGV) configured to travel into and through the processing zone of the manufacturing system, and to move load suspension devices from one manufacturing system to another manufacturing system;
the at least one manufacturing system configured to receive two or more load suspension devices of different types with workpieces or workpiece components in a predetermined sequence, and to lift and transfer a workpiece from one load suspension device to another load suspension device;

wherein:
the at least one manufacturing means is arranged in the processing zone,
the manufacturing means is configured to handle a workpiece and to transfer the workpiece to another load suspension device of the same or a different type, and
the manufacturing means is configured for the suspended retention of the workpiece during processing and is configured as an industrial robot, such that the industrial robots supports the workpiece during processing.

2. The manufacturing facility of claim 1, wherein:
the load suspension devices are configured to receive at least one of a workpiece or an application-specific tool; and
the load suspension devices which differ in type are configured to accommodate different workpieces.

3. The manufacturing facility of claim 1, further comprising:
a facility control system with at least one control unit configured as a tool store manager;
wherein the tool store manager controls at least one of:
the storage of control programs in the control systems of the respective individual manufacturing systems, or
the equipping of the individual manufacturing systems or manufacturing means with application-specific tools.

4. The manufacturing facility of claim 1, wherein a first manufacturing system configured for carrying out a primary process on a workpiece is linked with a second manufacturing system configured for carrying out a secondary process on the workpiece.

5. The manufacturing facility of claim 1, wherein:
the additional information and data of the identifier fields include at least one of:
identity information for at least one of the load suspension device or a workpiece,
model specifications, or
an identifier of the manufacturing system or manufacturing cell most recently visited by the load suspension device; and
the identifier fields are described and updated in each manufacturing system.

6. The manufacturing facility of claim 1, wherein
the at least one manufacturing means is configured to process a workpiece; and
the manufacturing means is configured as an industrial robot having exchangeable, application-specific tools for performing each respective production process.

7. The manufacturing facility of claim 1, wherein
the load suspension device comprising various adapted receptacles and retaining means for the workpieces and/or tools holding them in a defined position.

8. The manufacturing facility of claim 1, wherein
the load suspension device comprising a plate-like or frame-like support as a base.

9. The manufacturing facility of claim 1, wherein the manufacturing means is configured to process the workpiece using at least one other industrial robot during the suspended retention of the workpiece with the industrial robot.

10. The manufacturing facility of claim 1, further comprising:
a facility control system with at least one control unit configured as a warehouse manager;
wherein the warehouse manager controls the stoppage and the displacement of the load suspension devices and the conveying mechanism.

11. The manufacturing facility of claim 10, wherein the control systems of the at least one manufacturing system are linked to the warehouse manager.

12. The manufacturing facility of claim 10, wherein:
control of the manufacturing facility is decentralized, wherein the control systems of the at least one manufacturing system independently control the processing of workpieces in the manufacturing systems and report the beginning and end of the production process to the warehouse manager; and
the warehouse manager controls the production process by displacing the load suspension devices and conveying mechanisms.

13. A method for processing workpieces in an automatic manufacturing system having at least one program-controlled manufacturing means and one processing zone, the method comprising:
displacing a first of at least two load suspension devices of different types into a processing zone of a first manufacturing system, wherein the first manufacturing system comprises:
at least one program-controlled manufacturing means,
a processing zone configured for the sequential receipt of at least two load suspension devices of different types,
a detection device configured to detect a type identifier of one of the load suspension devices, and
a control system configured to determine the type of load suspension device based on the type identifier detected by the detection device and to select and run a control program for the at least one manufacturing means from among a plurality of control programs on the basis of the determined type;
automatically detecting and determining the type of the first load suspension device;
automatically selecting, from a plurality of control programs, a control program that is associated with the determined type for the at least one manufacturing means;
automatically running the selected control program;
wherein the type identifier is configured as encoding and contains additional information and data in addition to indicating the type, and includes a plurality of identifier fields containing the additional information and data;
receiving a workpiece from the first load suspension device by at least one manufacturing means;
moving the first load suspension device from the processing zone of the first manufacturing system;
moving a second load suspension device, which is of a different type from the first load suspension device, into the processing zone of the first manufacturing system;
depositing the workpiece on a second of at least two load suspension devices;
moving a further workpiece into the processing zone of the first manufacturing system with the second load suspension device; and
relocating at least one type of the load suspension devices to and from the manufacturing system with a conveying mechanism;
wherein the conveying mechanism has at least one conveying means configured as an autonomous, steerable, floor-bound driverless transport vehicle (AGV) configured to travel into and through the processing zone of the manufacturing system, and to move load suspension devices from one manufacturing system to another manufacturing system.

14. The method of claim 13, further comprising:
moving the first or the second load suspension device from the processing zone of the first manufacturing system into the processing zone of a second manufacturing system.

15. The method of claim 13, wherein
the load suspension device comprising various adapted receptacles and retaining means for the workpieces and/or tools holding them in a defined position.

16. The method of claim 13, wherein
the load suspension device comprising a plate-like or frame-like support as a base.

17. The method of claim 13, further comprising:
maintaining the workpiece in suspended retention with a first industrial robot of the manufacturing means while processing the workpiece with at least a second industrial robot of the manufacturing means.

18. The method of claim 13, further comprising:
carrying out a primary process on a workpiece in the first manufacturing system; and
carrying out a secondary process on the workpiece in a second manufacturing system connected with the first manufacturing system.

19. The method of claim 18, further comprising:
exchanging workpieces between the first manufacturing system and the second manufacturing system using a program-controlled manufacturing means, wherein the second manufacturing system is linked directly to the first manufacturing system via an interface.

20. The method of claim 13, wherein the additional information and data of the identifier fields include at least one of:
identity information for at least one of the load suspension device or a workpiece;
model specifications; or
an identifier of a manufacturing system or manufacturing cell most recently visited by the load suspension device.

21. The method of claim 20, wherein:
the identifier field contains a cell identifier or an identifier of the manufacturing system most recently visited by the load suspension device; and
the method further comprises describing and updating the identifier field in each manufacturing system.

* * * * *